US012012219B2

(12) United States Patent
Esser et al.

(10) Patent No.: US 12,012,219 B2
(45) Date of Patent: Jun. 18, 2024

(54) AIRCRAFT BUFFET DETECTION

(71) Applicant: THE BOEING COMPANY, Chicago, IL (US)

(72) Inventors: Thomas John Esser, Seattle, WA (US); Jia Luo, Bellevue, WA (US); Dustin K. Biggerstaff, Snohomish, WA (US); Darren Gordon McDonald, Federal Way, WA (US)

(73) Assignee: THE BOEING COMPANY, Arlington, VA (US)

(*) Notice: Subject to any disclaimer, the term of this patent is extended or adjusted under 35 U.S.C. 154(b) by 442 days.

(21) Appl. No.: 17/355,436

(22) Filed: Jun. 23, 2021

(65) Prior Publication Data

US 2022/0073211 A1 Mar. 10, 2022

Related U.S. Application Data

(60) Provisional application No. 63/053,008, filed on Jul. 17, 2020.

(51) Int. Cl.
*B64D 45/00* (2006.01)
*B64D 43/02* (2006.01)

(52) U.S. Cl.
CPC ............. *B64D 45/00* (2013.01); *B64D 43/02* (2013.01)

(58) Field of Classification Search
None
See application file for complete search history.

(56) References Cited

U.S. PATENT DOCUMENTS 3,686,936 A * 8/1972 Daudt, Jr. ............... B64D 43/02
73/178 R
4,910,513 A * 3/1990 Kelly ................... G01C 23/005
340/975

(Continued)

FOREIGN PATENT DOCUMENTS

KR    1020050091792    *  8/2005
KR     101749646 B1  *  6/2017

OTHER PUBLICATIONS

Malik, Sheharyar, et al., Buffet Mitigation Control System for High-Performance Aircraft, 2021 IEEE Aerospace Conference, DOI: 10.1109/AERO50100.2021.9438488 (Year: 2021).*

(Continued)

*Primary Examiner* — Hunter B Lonsberry
*Assistant Examiner* — Kyle Patrick Rufer
(74) *Attorney, Agent, or Firm* — Moore IP Law

(57) ABSTRACT

A device includes one or more processors configured to access sensor data generated during a time window by one or more sensors onboard an aircraft. The one or more processors are configured to determine, based on the sensor data, a lateral acceleration dataset indicating frequency and magnitude of lateral buffet of the aircraft detected during the time window. The one or more processors are configured to determine, based on the sensor data, a vertical acceleration dataset indicating frequency and magnitude of vertical buffet of the aircraft detected during the time window. The one or more processors are configured to determine a buffet metric based on the lateral acceleration dataset and the vertical acceleration dataset. The one or more processors are configured to determine a buffet indicator based, at least in part, on the buffet metric. The one or more processors are configured to provide the buffet indicator to a display.

23 Claims, 17 Drawing Sheets

(56) References Cited

U.S. PATENT DOCUMENTS

| | | | | |
|---|---|---|---|---|
| 8,174,926 | B2* | 5/2012 | Kluver | G01V 1/3808 |
| | | | | 367/24 |
| 9,501,061 | B2* | 11/2016 | Canoy | G05D 1/0011 |
| 2013/0158991 | A1* | 6/2013 | Dong | G08G 5/0013 |
| | | | | 704/235 |
| 2013/0206916 | A1* | 8/2013 | Kordt | B64C 13/16 |
| | | | | 244/203 |
| 2020/0150677 | A1* | 5/2020 | Walters | G05D 1/0225 |

OTHER PUBLICATIONS

Mechanical Vibration and Shock, ISO 2631-1:1997 (Year: 1997).*
Breen, Dennis, L. et al., "A Comparison of Two Whole-Body Vibration Standards as Applied to Rotary-Wing Aircraft: ISO 2631vs ADS 27," United States Army Aeromedical Research Laboratory, Fort Rucker, AL Jul. 1988, 34 pgs.
Evaluating Turbine Engine Operating Characteristics, U.S. Department of Transportation Federal Aviation Administration, AC No. 25.939-1, Mar. 19, 1986, pp. 1-11.
International Standard ISO 2631, 1997.
Extended European Search Report for Application No. 21186235.4 dated Dec. 3, 2021, 9 pgs.
Meyer, Edward Thomas, "Quantitative Measurement Techniques for Vibration and Buffet," Thesis submitted to the College of Engineering and Science of Florida Institute of Technology, Dec. 2018, retrieved at https://repository.lib.fit.edu/handle/11141/2692, p. 1-66.
NATO: Design Loads for Future Aircraft, Feb. 2002, retrieved from https://www.sto.nato.int > RTO-TR-045, pp. 62-69.

* cited by examiner

AIRCRAFT BUFFET DETECTION

CROSS-REFERENCE TO RELATED APPLICATIONS

The present application claims the benefit of U.S. Provisional Patent Application No. 63/053,008 entitled "AIRCRAFT BUFFET DETECTION," filed Jul. 17, 2020, the contents of which are incorporated by reference in their entirety.

FIELD OF THE DISCLOSURE

The present disclosure is generally related to detecting aircraft buffet.

BACKGROUND

Buffeting of an aircraft is an indicator that the aircraft is approaching an aerodynamic limit, such as a stall limit. Traditional methods of quantifying buffet rely on pilot perception. For example, different pilots can make buffet determinations at different stages of a stall maneuver of an aircraft because each pilot's tolerance for buffet can be different. The same pilot can also make the buffet determinations at different stages of a maneuver performed at different times because tolerance for buffet can vary for the same person. Subjective determination of buffet can lead to inaccuracies in buffet detection.

SUMMARY

In a particular implementation, a device for detecting aircraft buffet includes one or more processors that are configured to access sensor data generated during a time window by one or more sensors onboard an aircraft. The one or more processors are also configured to determine, based on the sensor data, a lateral acceleration dataset indicating frequency and magnitude of lateral buffet of the aircraft detected during the time window. The one or more processors are further configured to determine, based on the sensor data, a vertical acceleration dataset indicating frequency and magnitude of vertical buffet of the aircraft detected during the time window. The one or more processors are also configured to determine a buffet metric based on the lateral acceleration dataset and the vertical acceleration dataset. The one or more processors are further configured to determine a buffet indicator based, at least in part, on the buffet metric. The one or more processors are also configured to provide the buffet indicator to a display device.

In another particular implementation, a method of detecting aircraft buffet includes accessing sensor data generated during a time window by one or more sensors onboard an aircraft. The method also includes determining, based on the sensor data, a lateral acceleration dataset indicating frequency and magnitude of lateral buffet of the aircraft detected during the time window. The method further includes determining, based on the sensor data, a vertical acceleration dataset indicating frequency and magnitude of vertical buffet of the aircraft detected during the time window. The method also includes determining a buffet metric based on the lateral acceleration dataset and the vertical acceleration dataset. The method further includes determining a buffet indicator based, at least in part, on the buffet metric. The method also includes providing the buffet indicator to a display device.

In another particular implementation, a computer-readable storage device stores instructions that, when executed by one or more processors, cause the one or more processors to access sensor data generated during a time window by one or more sensors onboard an aircraft. The instructions also cause the one or more processors to determine, based on the sensor data, a lateral acceleration dataset indicating frequency and magnitude of lateral buffet of the aircraft detected during the time window. The instructions further cause the one or more processors to determine, based on the sensor data, a vertical acceleration dataset indicating frequency and magnitude of vertical buffet of the aircraft detected during the time window. The instructions also cause the one or more processors to determine a buffet metric based on the lateral acceleration dataset and the vertical acceleration dataset. The instructions further cause the one or more processors to determine a buffet indicator based, at least in part, on the buffet metric. The instructions also cause the one or more processors to provide the buffet indicator to a display device.

The features, functions, and advantages described herein can be achieved independently in various implementations or may be combined in yet other implementations, further details of which can be found with reference to the following description and drawings.

DETAILED DESCRIPTION

Figure 1:
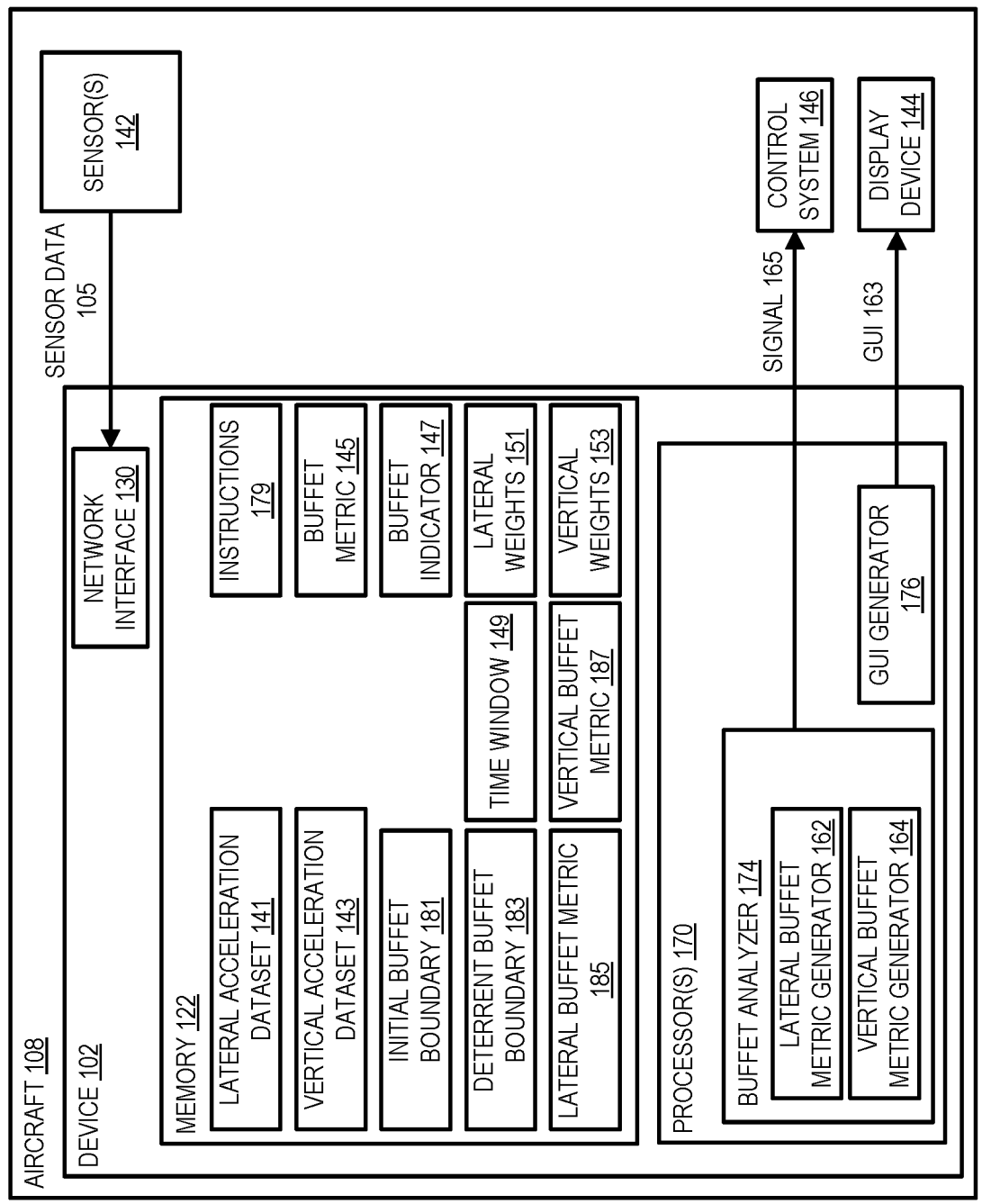
FIG. 1 is a diagram that illustrates a system configured to detect aircraft buffet.

Aspects disclosed herein present systems and methods for aircraft buffet detection. A buffet analyzer receives accelerometer sensor data from one or more sensors onboard an aircraft. For example, the accelerometer sensor data includes vertical acceleration sensor data and lateral acceleration sensor data associated with a time window. The buffet analyzer generates a vertical buffet metric for the time window based on the vertical acceleration sensor data. The buffet analyzer generates a lateral buffet metric for the time window based on the lateral acceleration sensor data. In a particular example, the buffet analyzer applies weights to the vertical and lateral acceleration sensor data to prioritize sensor data associated with frequencies that are more perceptible to humans and determines the vertical buffet metric and the lateral buffet metric based on weighted acceleration sensor data. The buffet analyzer generates a buffet metric (i.e., an overall buffet metric) based on the vertical buffet metric and the lateral buffet metric. The buffet analyzer determines whether no buffet, an initial buffet, or a deterrent buffet is detected based on a comparison of the buffet metric to an initial buffet boundary, a deterrent buffet boundary, or both. In a particular example, the initial buffet boundary and the deterrent buffet boundary are based on historical data at which initial buffet or deterrent buffet determinations have been made by various pilots.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 10, multiple sets of vertical buffet metrics are illustrated and associated with reference numbers 987A and 987B. When referring to a particular one of these sets of vertical buffet metrics, such as the vertical buffet metrics 987A, the distinguishing letter "A" is used. However, when referring to any arbitrary one of these sets of vertical buffet metrics or to these vertical buffet metrics as a group, the reference number 987 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 with one or more processors ("processor(s)" 170 in FIG. 1), which indicates that in some implementations the device 102 includes a single processor 170 and in other implementations the device 102 includes multiple processors 170. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to detect aircraft buffet. The system 100 includes a device 102 that is onboard or off-board an aircraft 108. In a particular aspect, the system 100 includes one or more sensors 142 onboard the aircraft 108. In a particular aspect, the device 102, the sensor 142, or a combination thereof, are integrated into the aircraft 108. In a particular aspect, the device 102, the sensor 142, or a combination thereof, can be moved (e.g., wheeled) onboard the aircraft 108 for testing or certification. The sensor 142 (e.g., an accelerometer) is configured to generate sensor data 105 (e.g., acceleration sensor data) indicating movement of the aircraft 108. For example, the sensor data 105 includes lateral acceleration sensor data indicating lateral movement of the aircraft 108, vertical acceleration sensor data indicating vertical movement of the aircraft 108, or both.

The device 102 includes one or more processors 170 coupled to a memory 122, a network interface 130, or both. The memory 122 includes a computer-readable medium (e.g., a computer-readable storage device) that stores instructions 179 that are executable by the processor 170. The instructions 179 are executable to initiate, perform, or control operations to aid in detection of aircraft buffet.

The memory 122 is configured to store boundary data including data indicating an initial buffet boundary 181, data indicating a deterrent buffet boundary 183, or a combination thereof. In a particular aspect, the boundary data is based on historical data. For example, the data indicating the initial buffet boundary 181 (e.g., a predetermined initial buffet boundary) is based on lateral acceleration and vertical acceleration at which pilots have historically indicated that buffet is perceptible to the pilots of various aircraft, such as, the aircraft 108, another aircraft of the same aircraft type as the aircraft 108, another aircraft of different aircraft type, or a combination thereof. As used herein, "initial buffet" refers to a level of buffet that is perceptible to a pilot or a passenger of an aircraft. As another example, the data indicating the deterrent buffet boundary 183 (e.g., a predetermined deterrent buffet boundary) is based on lateral acceleration and vertical acceleration at which pilots have historically indicated that deterrent buffet is detected by the pilots of various aircraft, such as, the aircraft 108, another aircraft of the same aircraft type as the aircraft 108, another aircraft of different aircraft type, or a combination thereof. As used herein, "deterrent buffet" refers to a level of buffet that is a deterrent to further execution of a maneuver, such as to further decreasing airspeed or to further increasing an angle of attack.

In a particular aspect, the processor 170 is configured to be coupled to a control system 146 (e.g., a flight control system) of the aircraft 108, to a display device 144, or both. In a particular aspect, the display device 144 is integrated into the aircraft 108 (e.g., a cockpit display of the aircraft 108), the device 102, or both. In a particular aspect, the display device 144 is integrated into a mobile device, an electronic flight bag (EFB), a cockpit display, the aircraft 108, the device 102, an off-board device, or a combination thereof.

The processor 170 includes a buffet analyzer 174, a graphical user interface (GUI) generator 176, or both, that can be implemented, at least in part, by the processor 170 executing the instructions 179. The processor 170 can be implemented as a single processor or as multiple processors, such as in a multi-core configuration, a multi-processor configuration, a distributed computing configuration, a cloud computing configuration, or any combination thereof. In some implementations, one or more portions of the buffet analyzer 174, the GUI generator 176, or both, are implemented by the processor 170 using dedicated hardware, firmware, or a combination thereof.

The buffet analyzer 174 includes a lateral buffet metric generator 162 that is configured to generate a lateral buffet metric 185 based on the sensor data 105 received from the sensor 142. The buffet analyzer 174 includes a vertical buffet metric generator 164 that is configured to generate a vertical buffet metric 187 based on the sensor data 105. The buffet analyzer 174 is configured to generate a buffet metric 145 based on the lateral buffet metric 185, the vertical buffet metric 187, or both. In a particular aspect, the buffet analyzer 174 is configured to, based on the buffet metric 145, provide a signal 165 to the control system 146 to modify or end a flight maneuver of the aircraft 108. The GUI generator 176 is configured to generate a buffet indicator 147 based on the buffet metric 145 and to generate a GUI 163 that includes the buffet indicator 147. The GUI generator 176 is configured to provide the GUI 163 to the display device 144.

During operation, the device 102 receives, via the network interface 130, sensor data 105 from the sensor 142. For example, the device 102 receives the sensor data 105 during a flight of the aircraft 108. In a particular aspect, the buffet analyzer 174, in response to user input indicating initiation of a buffet detection period, extracts acceleration datasets corresponding to a plurality of time windows from the sensor data 105. For example, the buffet analyzer 174 extracts a lateral acceleration dataset 141, a vertical acceleration dataset 143, or both, from the sensor data 105 corresponding to a time window 149. To illustrate, the lateral acceleration dataset 141, the vertical acceleration dataset 143, or both, indicate movement of the aircraft 108 detected during a time window 149 (e.g., a 2-second time window). In another example, the buffet analyzer 174 extracts a second lateral acceleration dataset, a second vertical acceleration dataset, or both, from the sensor data 105 corresponding to a second time window. In a particular aspect, the second time window is subsequent to the time window 149. In a particular aspect, the second time window and the time window 149 are non-overlapping. In an alternative aspect, the second time window at least partially overlaps the time window 149.

In a particular aspect, the buffet analyzer 174 generates buffet metrics for the plurality of time windows based on the acceleration datasets. For example, the buffet analyzer 174 generates a buffet metric 145 based on the lateral acceleration dataset 141, the vertical acceleration dataset 143, or a combination thereof, for the time window 149, as described herein. In a particular aspect, the buffet analyzer 174 generates a second buffet metric based on the second lateral acceleration dataset, the second vertical acceleration dataset, or a combination thereof, for the second time window.

The lateral buffet metric generator 162 generates a lateral buffet metric 185 for the time window 149. For example, the lateral buffet metric generator 162 generates the lateral buffet metric 185 based on the lateral acceleration dataset 141 and lateral weights 151, as further described with reference to FIG. 2. The lateral buffet metric 185 represents lateral movement (e.g., average lateral movement) of the aircraft 108 during the time window 149. The vertical buffet metric generator 164 generates a vertical buffet metric 187 for the time window 149. For example, the vertical buffet metric generator 164 generates the vertical buffet metric 187 based on the vertical acceleration dataset 143 and vertical weights 153, as further described with reference to FIG. 2. The vertical buffet metric 187 represents vertical movement (e.g., average vertical movement) of the aircraft 108 during the time window 149.

The buffet analyzer 174 determines a buffet metric 145 based on the lateral buffet metric 185, the vertical buffet metric 187, or both. For example, the buffet metric 145 represents a combined value indicating multi-directional (e.g., lateral and vertical) buffet detected at the aircraft 108 during the time window 149. In a particular aspect, the buffet analyzer 174 generates a buffet indicator 147 based on a comparison of the buffet metric 145 to the initial buffet boundary 181, the deterrent buffet boundary 183, or both. For example, the buffet analyzer 174, in response to determining that the buffet metric 145 is within the initial buffet boundary 181, generates the buffet indicator 147 including a first indication that no buffet is detected. Alternatively, the buffet analyzer 174, in response to determining that the buffet metric 145 exceeds (e.g., is greater than or equal to) the initial buffet boundary 181 and is within the deterrent buffet boundary 183, generates the buffet indicator 147 including a second indication that initial buffet is detected. In a particular aspect, the buffet analyzer 174, in response to determining that the buffet metric 145 exceeds (e.g., is greater than or equal to) the deterrent buffet boundary 183, generates the buffet indicator 147 including a third indication that deterrent buffet is detected.

The buffet indicator 147 including three types of indications based on the buffet metric 145 is provided as an illustrative example. In other implementations, the buffet indicator 147 may include fewer than three indications or more than three indications based on the buffet metric 145. In a particular example, the buffet indicator 147 includes no indication when no buffet is detected, includes a first indication when initial buffet is detected, and includes a second indication when deterrent buffet is detected. To illustrate, the first indication includes a first visual indication, a first audio indication, a first haptic indication, or a combination thereof, indicating that initial buffet is detected during the time window 149. To illustrate, the first indication indicates a time at which initial buffet is detected. The second indication includes a second visual indication, a second audio indication (e.g., a stall warning alert), a second haptic indication, or a combination thereof, indicating that deterrent buffet is detected during the time window 149. To illustrate, the second indication indicates a time at which deterrent buffet is detected. An absence of an indication (e.g., a visual indication, an audio indication, a haptic indication, or a combination thereof) in the buffet indicator 147 can indicate that no buffet is detected during the time window 149. For example, the absence of the indication can indicate that no buffet is detected at a corresponding time.

The first time corresponds to the time window 149. In a particular example, the first time indicates a start time of the time window 149, an end time of the time window 149, a middle time of the time window 149, or another time associated with the time window 149. In a particular example, the first time is based on a timestamp associated with the lateral acceleration dataset 141, a timestamp associated with the vertical acceleration dataset 143, or both. In a particular aspect, the first time is based on a time at which the buffet indicator 147 is generated or updated.

In a particular aspect, the buffet analyzer 174 generates an output (e.g., a visual output, an audio output, a haptic output, or a combination thereof) based on the buffet indicator 147. For example, the buffet analyzer 174 generates a GUI 163 including at least a portion (e.g., a visual portion, an audio portion, or both) of the buffet indicator 147 and provides the GUI 163 to the display device 144. The system 100 thus enables a pilot to make informed flight decisions based on the buffet indicator 147. For example, the pilot can increase airspeed or decrease an angle of attack in response to the buffet indicator 147 indicating that deterrent buffet is detected. In a particular example, a flight test engineer can detect buffet during or after certification flights based on the buffet indicator 147.

In a particular aspect, the buffet analyzer 174 generates a signal 165 based on the buffet metric 145. For example, the buffet analyzer 174, in response to determining that the buffet metric 145 exceeds the deterrent buffet boundary 183, provides the signal 165 to the control system 146 to modify or end a flight maneuver of the aircraft 108. To illustrate, the signal 165 may cause the aircraft 108 to increase airspeed or decrease an angle of attack of the aircraft 108. The system 100 thus enables the aircraft 108 to dynamically respond to detection of deterrent buffet in a timely manner (e.g., without pilot delay) to avoid stall conditions.

The system 100 enables automatic detection of initial buffet and deterrent buffet in a manner that is more reliable and more repeatable than detection by a pilot. For example, different pilots can have different sensitivity to buffet at various times and may perceive initial buffet or deterrent buffet differently. The buffet analyzer 174 automatically detects no buffet, initial buffet, or the deterrent buffet based on a comparison of the buffet metric 145 to the initial buffet boundary 181, the deterrent buffet boundary 183, or both.

Although the control system 146, the buffet analyzer 174, and the GUI generator 176 are depicted as separate components, in other implementations the described functionality of two or more of the control system 146, the buffet analyzer 174, and the GUI generator 176 can be performed by a single component. In some implementations, each of the device 102, the control system 146, the buffet analyzer 174, and the GUI generator 176 can be represented in hardware, such as via an application-specific integrated circuit (ASIC) or a field-programmable gate array (FPGA), or the operations described with reference to the elements may be performed by a processor executing computer-readable instructions.

Although FIG. 1 illustrates particular examples for clarity of explanation, such examples are not to be considered as limitations. For example, although the device 102 is described as onboard the aircraft 108, in other examples at least the buffet analyzer 174 of the device 102 can be external to the aircraft 108, such as in an off-board device that is configured to receive the sensor data 105 from the sensor 142, the aircraft 108, or a combination thereof.

Figure 2:
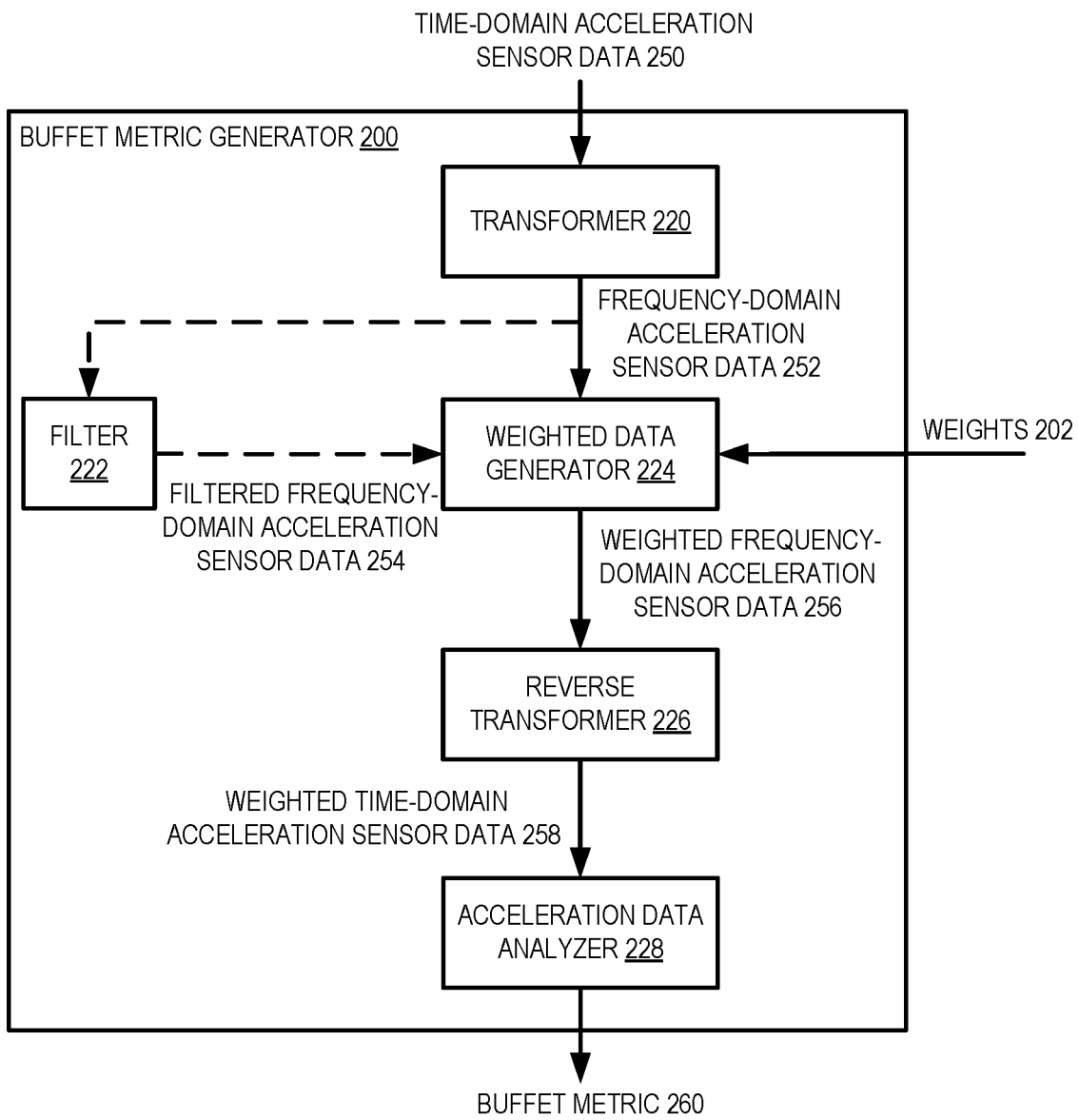
FIG. 2 is a diagram of a particular implementation of a buffet metric generator of the system of FIG. 1.

Referring to FIG. 2, an illustrative example of a particular implementation of a buffet metric generator 200 is shown. In a particular aspect, the buffet metric generator 200 corresponds to the lateral buffet metric generator 162 of FIG. 1. In this aspect, time-domain acceleration sensor data 250, weights 202, and a buffet metric 260 correspond to the lateral acceleration dataset 141, the lateral weights 151, and the lateral buffet metric 185 of FIG. 1, respectively. In a particular aspect, the buffet metric generator 200 corresponds to the vertical buffet metric generator 164 of FIG. 1. In this aspect, the time-domain acceleration sensor data 250, the weights 202, and the buffet metric 260 correspond to the vertical acceleration dataset 143, the vertical weights 153, and the vertical buffet metric 187 of FIG. 1, respectively. In a particular example, a first version of the buffet metric 260 corresponds to the lateral buffet metric 185, a second version of the buffet metric 260 corresponds to the vertical buffet metric 187, and the buffet metric 145 is based on the first version of the buffet metric 260 (e.g., the lateral buffet metric 185) and the second version of the buffet metric 260 (e.g., the vertical buffet metric 187).

The buffet metric generator 200 includes a transformer 220 coupled via a weighted data generator 224 and a reverse transformer 226 to an acceleration data analyzer 228. In a particular aspect, the transformer 220 is coupled via a filter 222 to the weighted data generator 224.

During operation, the buffet analyzer 174 provides time-domain acceleration sensor data 250 (e.g., the lateral acceleration dataset 141 or the vertical acceleration dataset 143)

to the transformer 220. The transformer 220 generates frequency-domain acceleration sensor data 252 by applying a time-domain to frequency-domain transform (e.g., a discrete fourier transform (DFT)) to the time-domain acceleration sensor data 250, as further described with reference to FIG. 5. For example, the transformer 220 is configured to use DFT to convert the lateral acceleration dataset 141 (e.g., time-domain lateral acceleration sensor data) or the vertical acceleration dataset 143 (e.g., time-domain vertical acceleration sensor data) to frequency-domain lateral acceleration sensor data or frequency-domain vertical acceleration sensor data, respectively.

In a particular aspect, the transformer 220 provides the frequency-domain acceleration sensor data 252 to the filter 222. The filter 222 generates filtered frequency-domain acceleration sensor data 254 by filtering (e.g., removing) a portion of the frequency-domain acceleration sensor data 252. To illustrate, the filter 222 removes data corresponding to frequencies that are not humanly perceptible from the frequency-domain acceleration sensor data 252. In a particular aspect, the filter 222 removes data associated with frequencies lower than a first frequency threshold, data associated with frequencies greater than a second frequency threshold, or both. The filter 222 generates filtered frequency-domain lateral acceleration sensor data or filtered frequency-domain vertical acceleration sensor data by filtering the frequency-domain lateral acceleration sensor data or the frequency-domain vertical acceleration sensor data, respectively.

The filter 222 provides the filtered frequency-domain acceleration sensor data 254 to the weighted data generator 224. In an alternative aspect, the transformer 220 provides the frequency-domain acceleration sensor data 252 to the weighted data generator 224 independently of the filter 222. In this aspect, the weighted data generator 224 can apply weights to the frequency-domain acceleration sensor data 252 to filter out data corresponding to frequencies that are either imperceptible or unobjectionable to humans.

The weighted data generator 224 generates weighted frequency-domain acceleration sensor data 256 by applying weights 202 to the frequency-domain acceleration sensor data 252 or to the filtered frequency-domain acceleration sensor data 254, as further described with reference to FIG. 5. For example, the weighted data generator 224 generates weighted frequency-domain lateral acceleration sensor data by applying the lateral weights 151 to the frequency-domain lateral acceleration sensor data or the filtered frequency-domain lateral acceleration sensor data. As another example, the weighted data generator 224 generates weighted frequency-domain vertical acceleration sensor data by applying the vertical weights 153 to the frequency-domain vertical acceleration sensor data or the filtered frequency-domain vertical acceleration sensor data. In a particular aspect, the weights 202 are associated with acceleration frequencies. For example, frequencies that are more readily perceptible to humans are assigned higher weights. Applying the weights 202 to generate the weighted frequency-domain acceleration sensor data 256 increases the impact (e.g., relative amplitude) of data corresponding to frequencies that have a greater impact on human perception. The lateral weights 151 are associated with lateral acceleration frequencies, and the vertical weights 153 are associated with vertical acceleration frequencies.

The reverse transformer 226 generates weighted time-domain acceleration sensor data 258 by applying a frequency-domain to time-domain transform (e.g., an inverse DFT) to the weighted frequency-domain acceleration sensor data 256, as further described with reference to FIG. 5. For example, the transformer 220 is configured to use inverse DFT (iDFT) to convert the weighted frequency-domain lateral acceleration sensor data) or the weighted frequency-domain vertical acceleration sensor data to weighted time-domain lateral acceleration sensor data or weighted time-domain vertical acceleration sensor data, respectively.

The acceleration data analyzer 228 generates a buffet metric 260 based on the weighted time-domain acceleration sensor data 258. For example, the buffet metric 260 includes an average value that is representative of the weighted time-domain acceleration sensor data 258. In a particular aspect, the acceleration data analyzer 228 generates lateral buffet metric 185 or the vertical buffet metric 187 based on the weighted time-domain lateral acceleration sensor data or weighted time-domain vertical acceleration sensor data, respectively. The lateral buffet metric 185 (e.g., an average value that) is representative of lateral buffet detected at the aircraft 108 during the time window 149. The vertical buffet metric 187 (e.g., an average value that) is representative of vertical buffet detected at the aircraft 108 during the time window 149. The buffet metric generator 200 thus enables quantification of buffet detected at the aircraft 108 during the time window 149.

Figure 3:
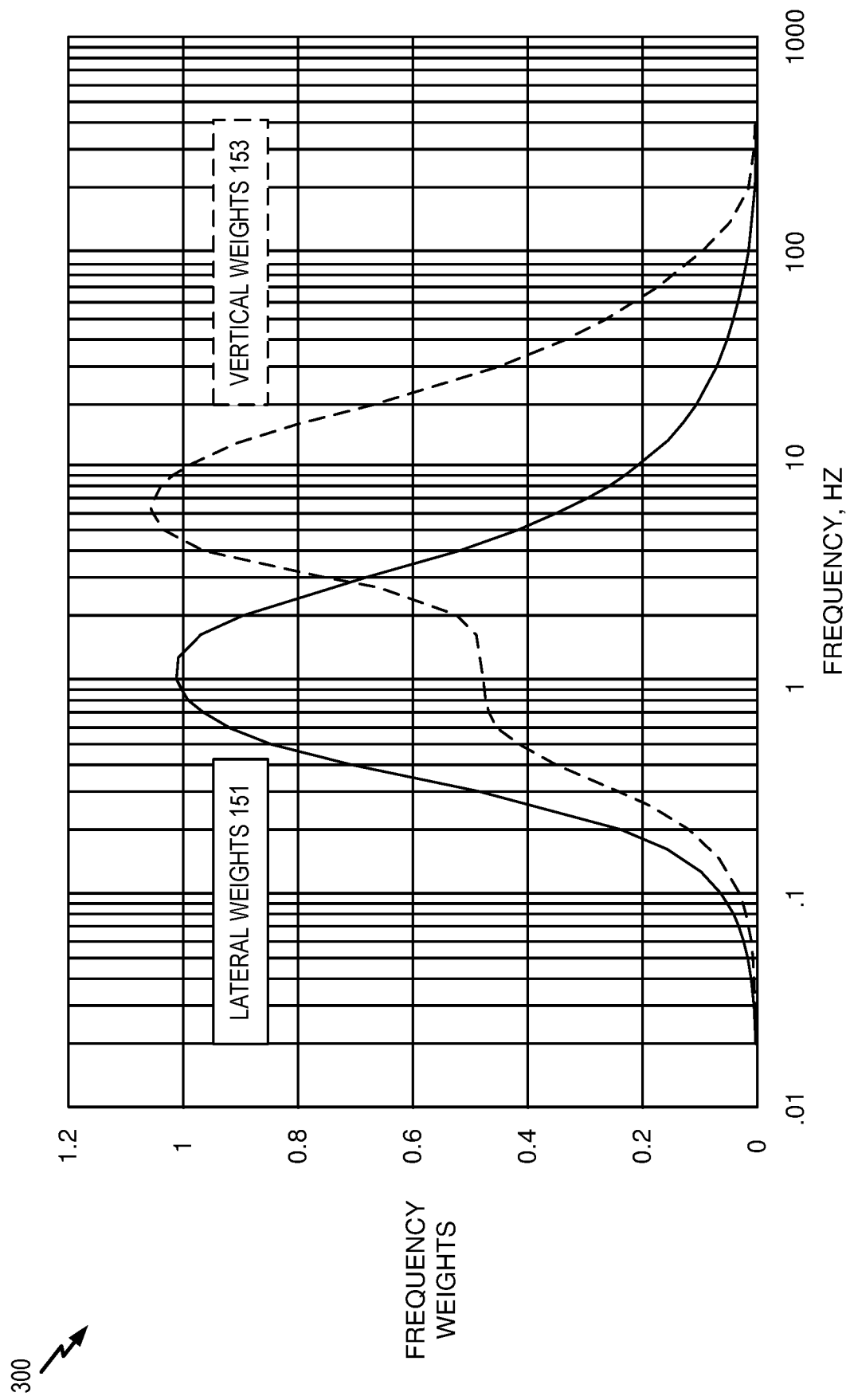
FIG. 3 is a diagram of a particular example of weights used by the system of FIG. 1.

Referring to FIG. 3, a diagram 300 of an example of the lateral weights 151 and the vertical weights 153 is shown. In a particular aspect, the lateral weights 151 and the vertical weights 153 are based on frequency weights for whole body vibration specified by international organization standards (ISO) 2631-1.

In a particular aspect, the vertical weights 153 include higher weights for frequencies of vertical accelerations that are more perceptible to humans. In a particular aspect, the lateral weights 151 include higher weights for frequencies of lateral accelerations that are more perceptible to humans.

Figure 4:
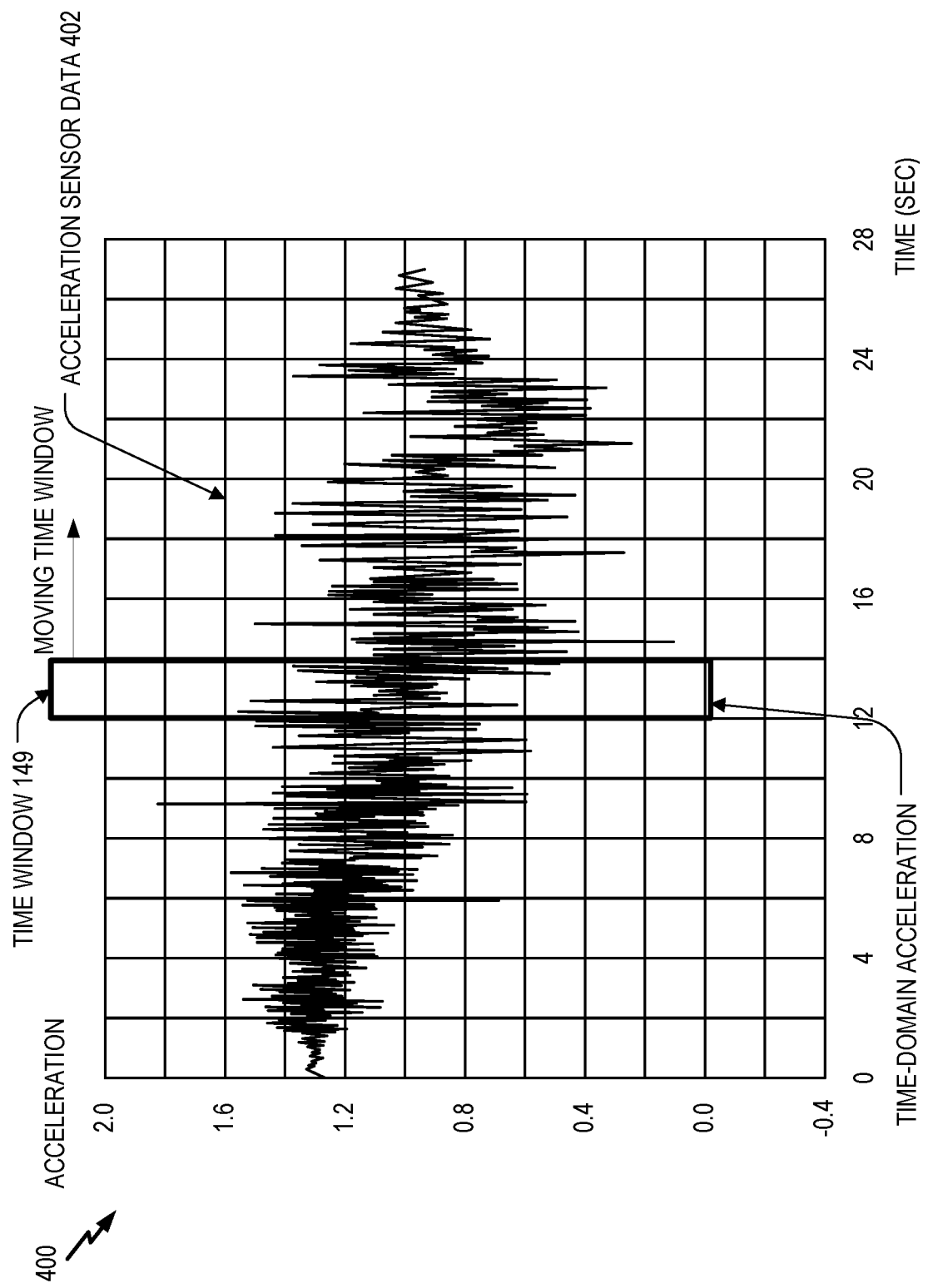
FIG. 4 is a diagram of a particular example of acceleration sensor data generated by the system of FIG. 1.

Referring to FIG. 4, a diagram 400 of an example of acceleration sensor data 402 is shown. In a particular aspect, the sensor data 105 of FIG. 1 includes the acceleration sensor data 402. For example, the acceleration sensor data 402 corresponds to time-domain lateral acceleration sensor data or time-domain vertical acceleration sensor data.

The buffet analyzer 174 analyzes datasets from the acceleration sensor data 402 corresponding to a moving time window to generate buffet metrics for a buffet detection period. For example, the acceleration sensor data 402 corresponds to a buffet detection period (e.g., that is 28 seconds long) and the buffet analyzer 174 analyzes the time-domain acceleration sensor data 250 (e.g., a portion of the acceleration sensor data 402) that corresponds to the time window 149 (e.g., a 2-second time window between 12 and 14 seconds) during the buffet detection period to generate the buffet metric 145. Similarly, the buffet analyzer 174 analyzes second time-domain acceleration sensor data (e.g., a second portion of the acceleration sensor data 402) that corresponds to a second time window (e.g., another 2-second time window) to generate a second buffet metric for the second time window. In a particular aspect, the second time window is subsequent to the time window 149. In a particular aspect, the second time window (e.g., between 13 and 15 seconds) at least partially overlaps the time window 149. In an alternative aspect, the second time window (e.g., between 14 and 16 seconds) does not overlap the time window 149.

In a particular example, the acceleration sensor data 402 includes time-domain lateral acceleration sensor data, and the time-domain acceleration sensor data 250 corresponds to the lateral acceleration dataset 141 of FIG. 1. In another example, the acceleration sensor data 402 includes time-domain vertical acceleration sensor data, and the time-domain acceleration sensor data 250 corresponds to the vertical acceleration dataset 143 of FIG. 1.

Figure 5:
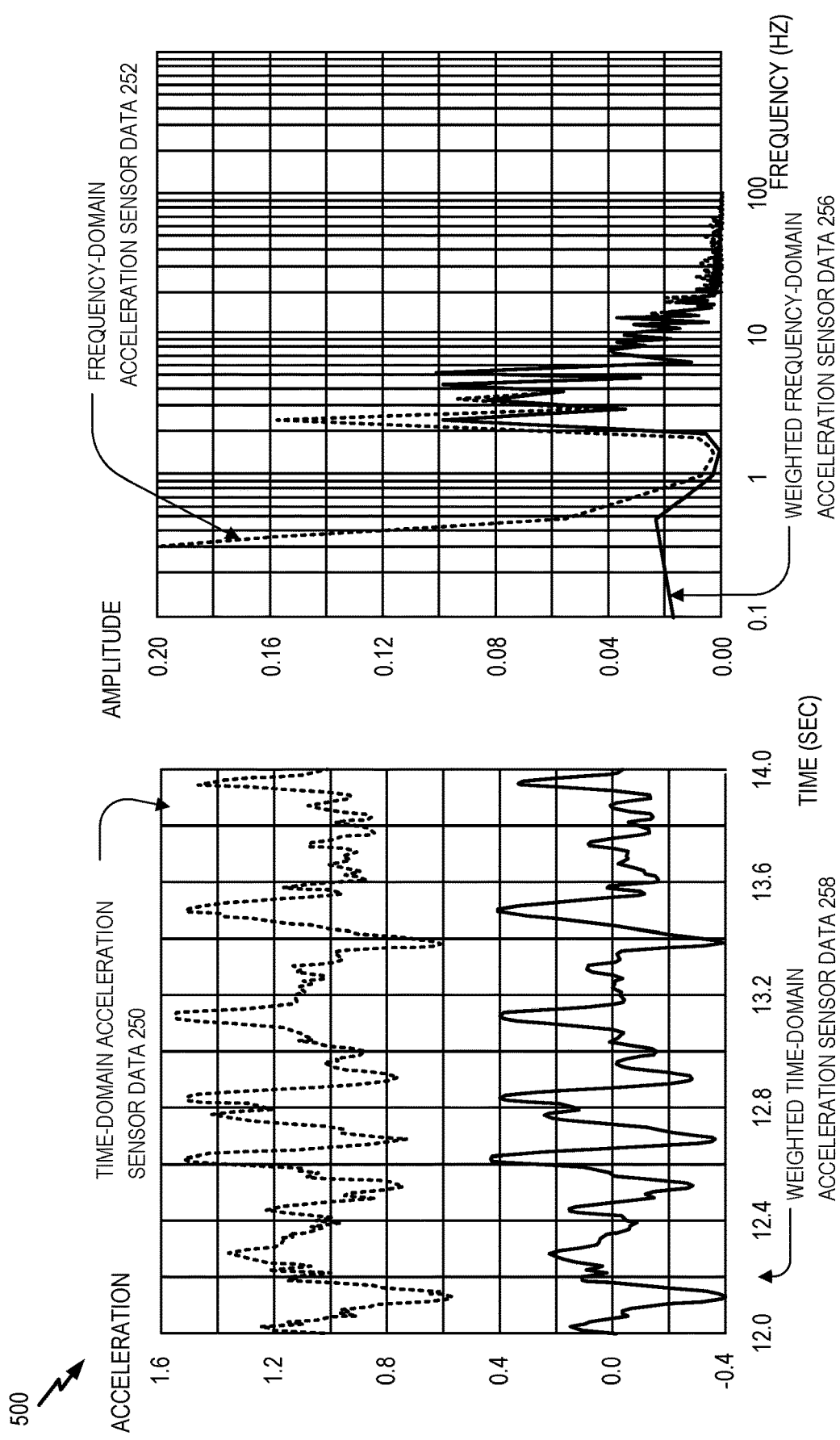
FIG. 5 is a diagram of a particular example of data generated by the system of FIG. 1.

Referring to FIG. 5, a diagram 500 of an example of data generated by the system 100 of FIG. 1 is shown. For example, the buffet analyzer 174 extracts the time-domain acceleration sensor data 250 corresponding to the time window 149 (e.g., a 2-second time window) from the acceleration sensor data 402 of FIG. 4.

The transformer 220 of FIG. 2 generates the frequency-domain acceleration sensor data 252 by performing forward DFT on the time-domain acceleration sensor data 250. The weighted data generator 224 generates the weighted frequency-domain acceleration sensor data 256 based on the frequency-domain acceleration sensor data 252, as described with reference to FIG. 2. The reverse transformer 226 generates the weighted time-domain acceleration sensor data 258 by performing inverse DFT on the weighted frequency-domain acceleration sensor data 256. In a particular aspect, the acceleration data analyzer 228 removes background vibration so that the weighted time-domain acceleration sensor data 258 centers around zero (e.g., 0.0). The acceleration data analyzer 228 generates the buffet metric 260 based on the centered version of the weighted time-domain acceleration sensor data 258.

Figure 6:
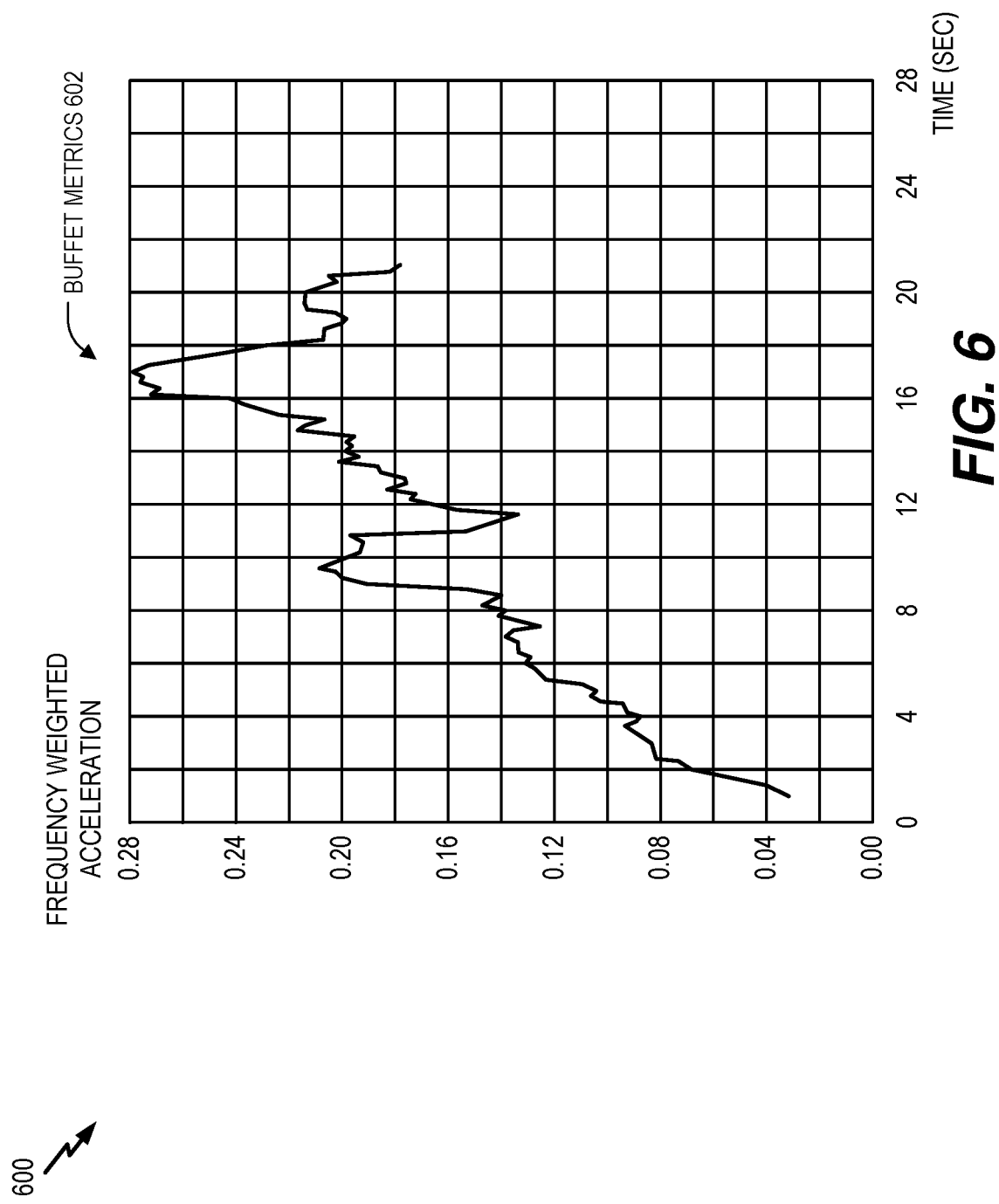
FIG. 6 is a diagram of a particular example of buffet metrics generated by the system of FIG. 1 for multiple time windows.

Referring to FIG. 6, a diagram 600 of an example of buffet metrics 602 generated by the system of FIG. 1 for multiple time windows is shown. For example, the buffet metrics 602 include the buffet metric 260. In a particular aspect, the buffet metrics 602 include lateral buffet metrics for the multiple time windows. For example, the buffet metrics 602 include the lateral buffet metric 185 for the time window 149 (e.g., a 2-second time window between 12 seconds and 14 seconds). In a particular aspect, the buffet metrics 602 include vertical buffet metrics for the multiple time windows. For example, the buffet metrics 602 include the vertical buffet metric 187 for the time window 149 (e.g., a 2-second time window between 12 seconds and 14 seconds).

In a particular aspect, the buffet metric generator 200 generates the buffet metrics 602 corresponding to non-overlapping time windows. For example, the buffet metrics 602 includes the buffet metric 260 corresponding to the time window 149 (e.g., between 12 seconds and 14 seconds), a second buffet metric corresponding to a second time window (e.g., between 14 seconds and 16 seconds), a third buffet metric corresponding to a third time window (e.g., between 16 seconds and 18 seconds), one or more additional buffet metrics, or a combination thereof. In this aspect, each of the time windows (e.g., each 2-second time window) corresponds to a single buffet metric value, and the buffet metrics 602 can jump from one value for a first time window (e.g., 12 to 14 seconds) to a second value for a second time window (e.g., 14 to 16 seconds).

In a particular aspect, the buffet metric generator 200 generates the buffet metrics 602 corresponding to overlapping time windows. For example, the buffet metrics 602 includes the buffet metric 260 corresponding to the time window 149 (e.g., between 12 seconds and 14 seconds), a second buffet metric corresponding to a second time window (e.g., between 12.1 seconds and 14.1 seconds), a third buffet metric corresponding to a third time window (e.g., between 12.2 seconds and 14.2 seconds), one or more additional buffet metrics, or a combination thereof. Each time window shifts by a particular time window shift duration (e.g., 0.1 seconds). In this aspect, the buffet metric 260 is associated with a first time (e.g., 13 seconds) of the time window 149 (e.g., between 12 seconds and 14 seconds), the second buffet metric is associated with a second time of the second time window (e.g., 13.1 seconds), the third buffet metric is associated with a third time of the third time window (e.g., 13.2 seconds), or a combination thereof. Using overlapping time windows enables the buffet metrics 602 to have finer granularity (e.g., one buffet metric value per 0.1 second time window shift duration) than using non-overlapping time windows (e.g., one buffet metric value per 2-second time window). The diagram 600 shows the buffet metrics 602 and the associated times.

Figure 7:
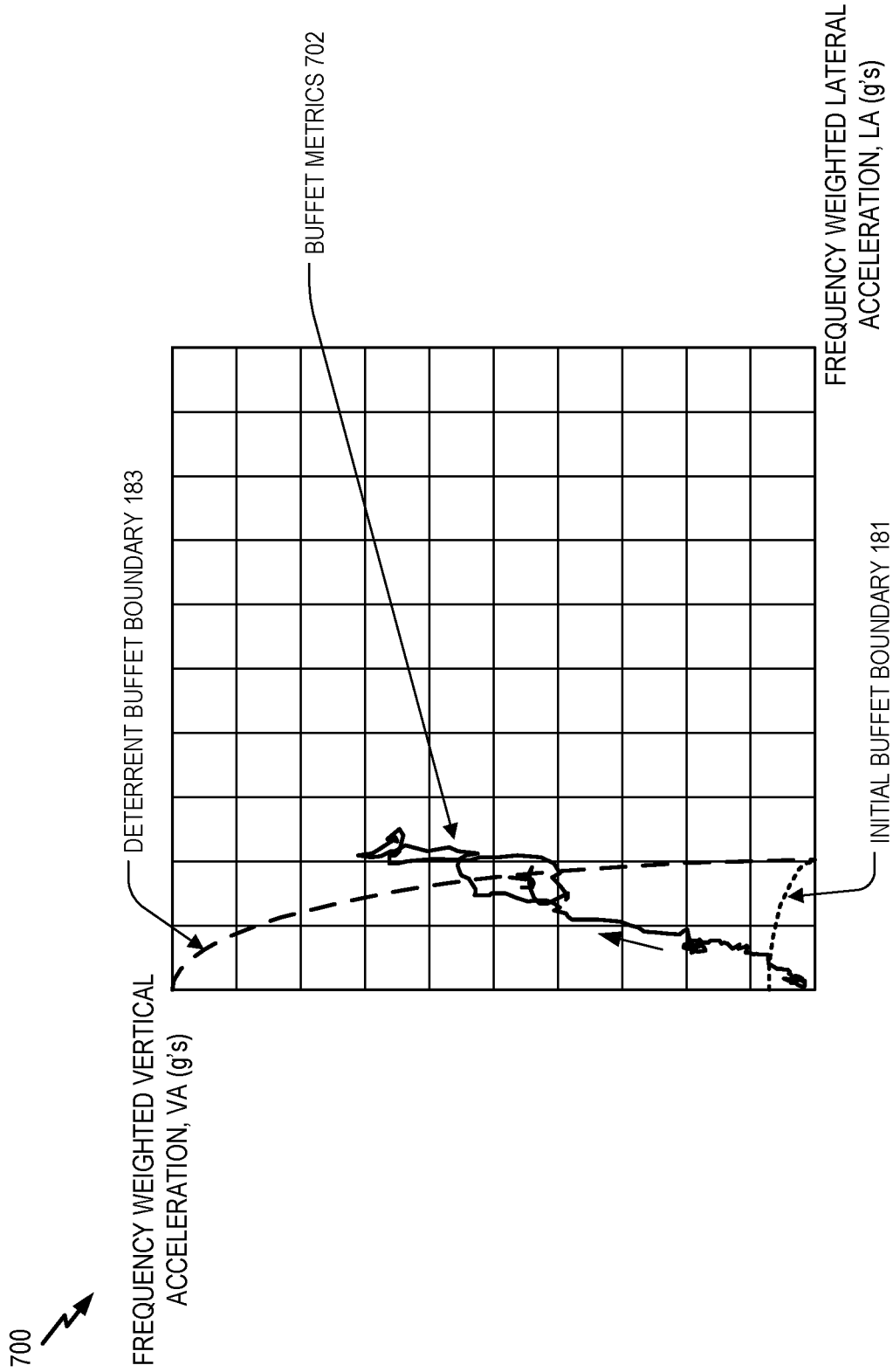
FIG. 7 is a diagram of an example of a comparison of buffet metric with an initial buffet boundary and a deterrent buffet boundary.

Referring to FIG. 7, a diagram 700 of an example of buffet metrics 702, the initial buffet boundary 181, and the deterrent buffet boundary 183 is shown. The buffet metrics 702 are based on the vertical buffet metrics (e.g., a first version of the buffet metrics 602) and lateral buffet metrics (e.g., a second version of the buffet metrics 602). For example, the buffet metrics 702 include the buffet metric 145 that is based on the vertical buffet metric 187 and the lateral buffet metric 185. To illustrate, each buffet metric value of the buffet metrics 702 represents a combined lateral and vertical buffet metric. In some aspects, the initial buffet boundary 181 indicates that quantification of initial buffet is more influenced by the frequency weighted vertical acceleration (VA) than by the frequency weighted lateral acceleration (LA). In some aspects, the deterrent buffet boundary 183 indicates that quantification of deterrent boundary is more influenced by frequency weighted lateral acceleration (LA) than by the frequency weighted vertical acceleration (VA).

The buffet analyzer 174 determines that no buffet is detected at flight times that the buffet metrics 702 are within the initial buffet boundary 181. The buffet analyzer 174 determines that initial buffet is detected at flight times at which the buffet metrics 702 exceed the initial buffet boundary 181. The buffet analyzer 174 determines that deterrent buffet is detected at flight times at which the buffet metrics 702 exceed the deterrent buffet boundary 183.

Figure 8:
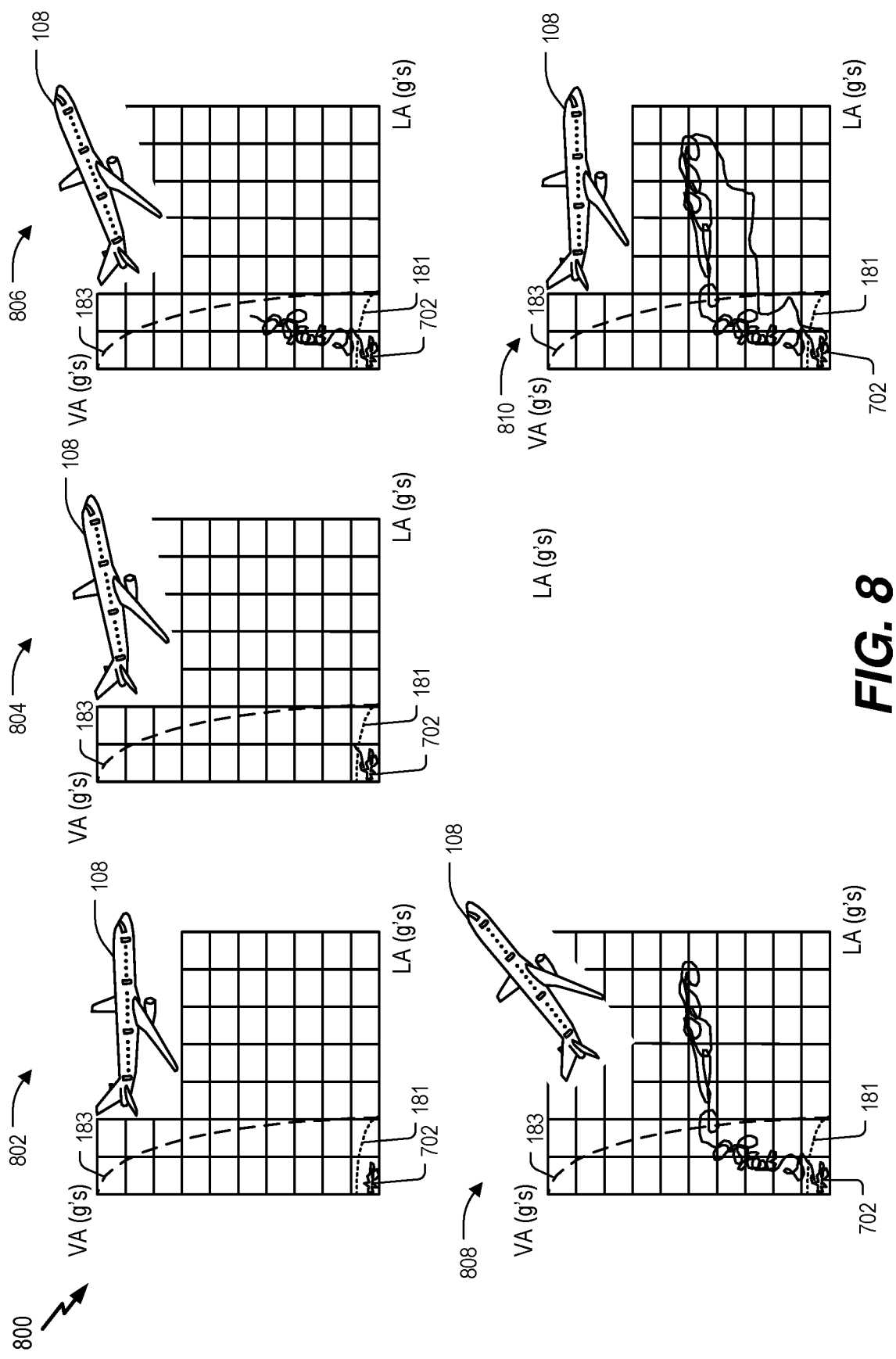
FIG. 8 is a diagram of an example of changes in detected buffet metric during a flight.

Referring to FIG. 8, a diagram 800 of an example of changes in buffet metrics 702 during a buffet detection period of a flight of the aircraft 108 is shown.

At 802, the aircraft 108 is in a trim state and the buffet metrics 702 indicate that no buffet is detected. At 804, the aircraft 108 begins deacceleration and the buffet metrics 702 indicate that initial buffet is detected. At 806, the aircraft 108 continues to increase angle of attack and the buffet metrics 702 indicate that buffet increases. At 808, the aircraft 108 stalls and the buffet metrics 702 indicate that deterrent buffet is detected. At 810, the aircraft 108 returns to a trim state and the buffet metrics 702 indicate that buffet level reduces to no buffet detected.

Figure 9:
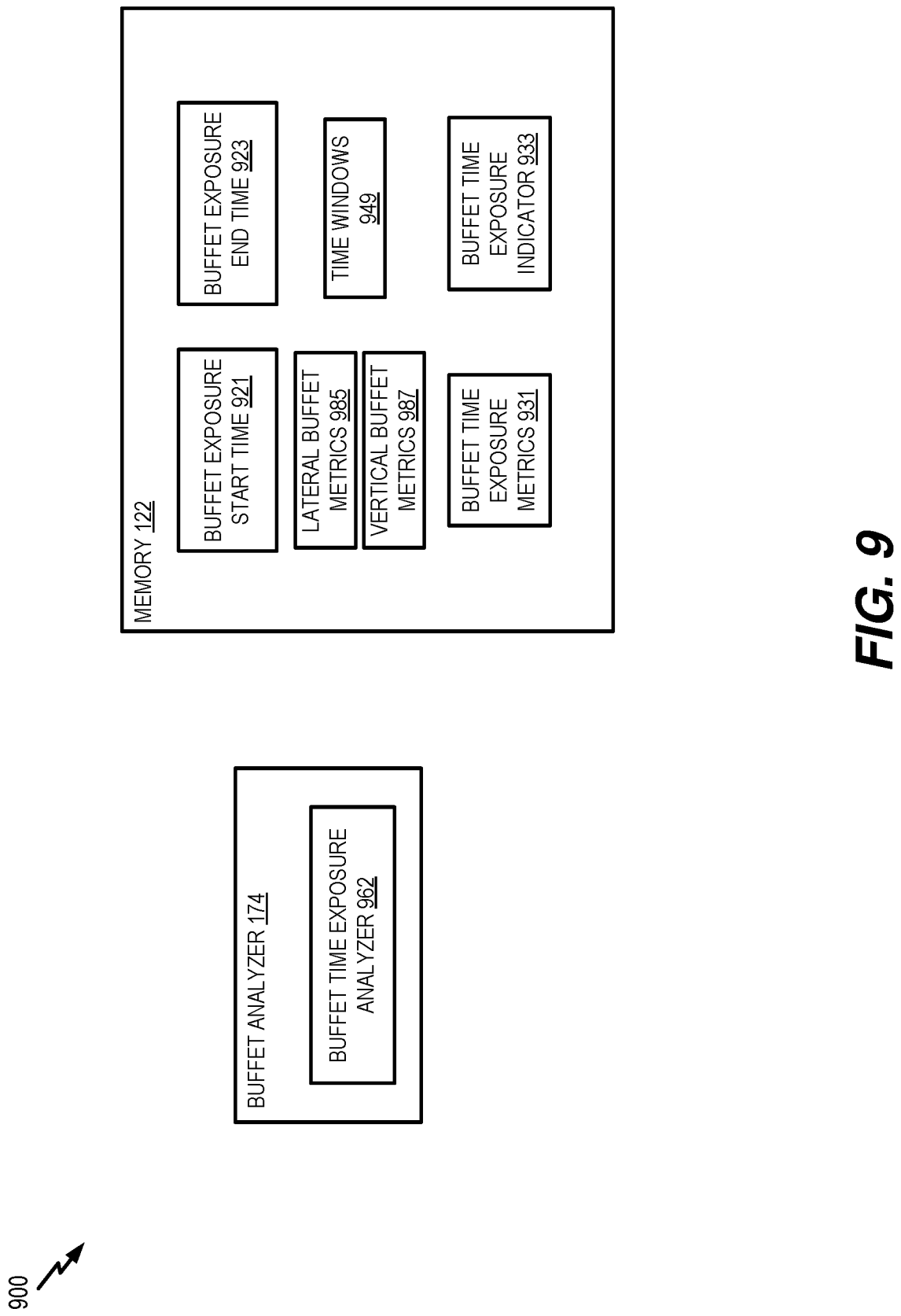
FIG. 9 is a diagram of an example of a system configured to detect buffet time exposure.

Referring to FIG. 9, an example of a system 900 configured to detect buffet time exposure is shown. In a particular aspect, the system 100 of FIG. 1 includes one or more components of the system 900. For example, the buffet analyzer 174 includes a buffet time exposure analyzer 962. The buffet time exposure analyzer 962 is configured to generate buffet time exposure metrics 931 that indicate cumulative exposure to buffet during a buffet exposure period.

In a particular aspect, the memory 122 stores a plurality of buffet metrics. For example, the memory 122 stores lateral buffet metrics 985, vertical buffet metrics 987, or a combination thereof, associated with a plurality of time windows 949. To illustrate, the lateral buffet metrics 985 and the vertical buffet metrics 987 include the lateral buffet metric 185 and the vertical buffet metric 187, respectively, associated with the time window 149.

The buffet time exposure analyzer 962 generates buffet time exposure metrics 931 associated with a buffet exposure period between a buffet exposure start time 921 and a buffet exposure end time 923. The buffet exposure period includes at least a portion of a buffet detection period. In a particular aspect, the buffet exposure period is the same as the buffet detection period. In an alternative aspect, the buffet exposure period starts from detection of an initial buffet and ends when buffet is no longer detected or the buffet detection period ends. As an illustrative example, during a 30-minute buffet detection period, buffet is detected from minute 5 to minute 10 and then again from minute 20 to minute 25. In a first implementation, the buffet time exposure metrics 931 based on the buffet detected during the entire 30-minute buffet detection period. In a second implementation, the buffet time exposure metrics 931 increase from minute 5 to minute 10, get reset after minute 10, and then increase again from minute 20 to minute 25. In the second implementation, the buffet time exposure metrics 931 at minute 25 are based on the buffet detected from minute 20 to minute 25. In a particular aspect, the buffet time exposure metrics 931 are based on a sum of an integral of the lateral buffet metrics 985 and an integral of the vertical buffet metrics 987, as further described with reference to FIG. 10.

In a particular aspect, the GUI generator 176 is configured to generate a buffet time exposure indicator 933 based on the buffet time exposure metrics 931. Pilots can be more sensitive to buffet the longer they are exposed to it. In some implementations, the buffet analyzer 174 determines that deterrent buffet is detected based on determining that a buffet time exposure metric exceeds a threshold and independently of whether a buffet metric exceeds the deterrent buffet boundary 183, as further described with reference to FIG. 13.

Figure 10:
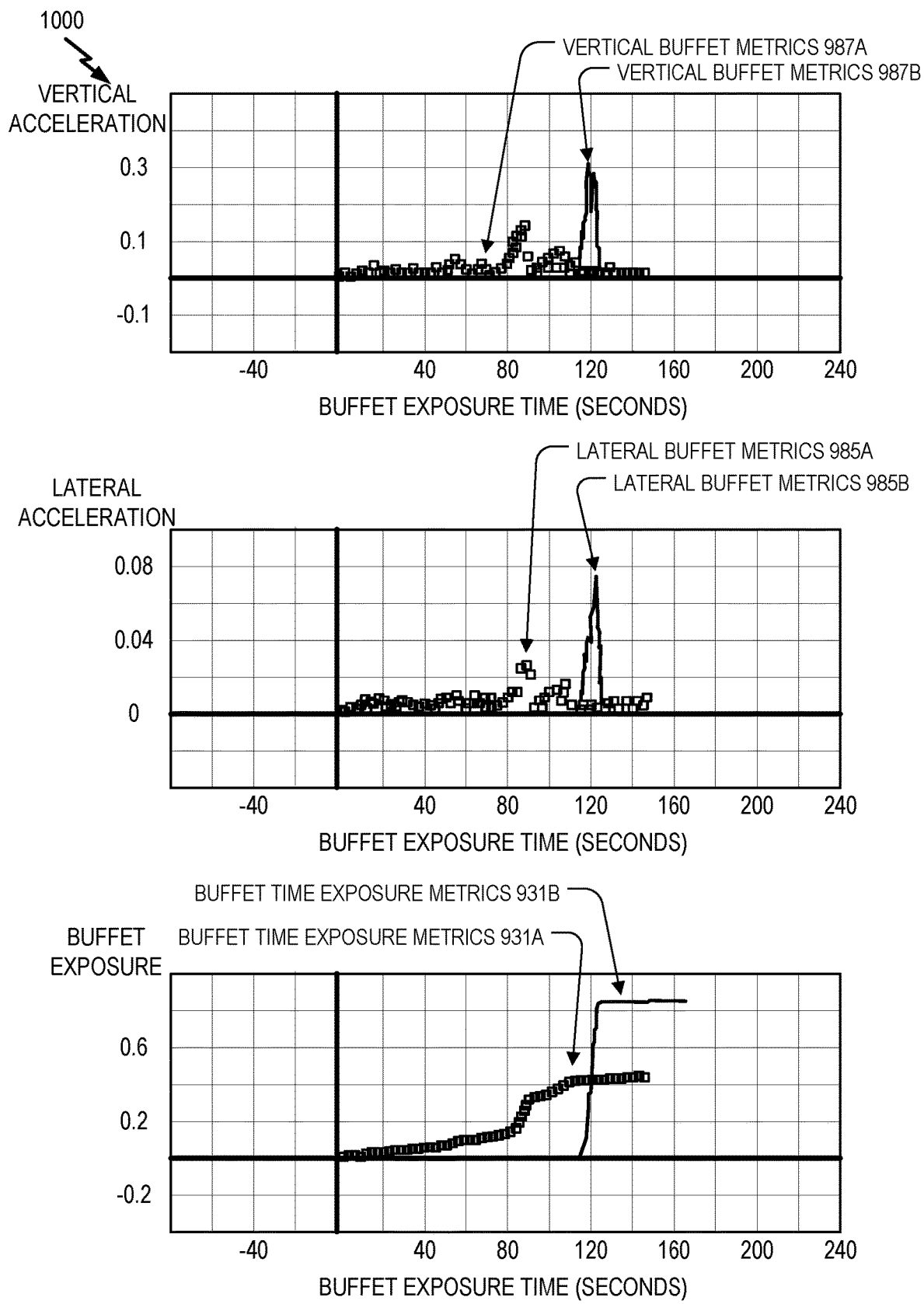
FIG. 10 is a diagram of examples of buffet time exposure determined by the system of FIG. 1.

Referring to FIG. 10, examples 1000 of the buffet time exposure metrics 931 based on the lateral buffet metrics 985 and the vertical buffet metrics 987 are shown. In a first example, the buffet time exposure analyzer 962 of FIG. 9 determines buffet time exposure metrics 931A based on lateral buffet metrics 985A and vertical buffet metrics 987A. In a particular aspect, a first buffet time exposure metric of the buffet time exposure metrics 931 at a first exposure time corresponds to an integral up to the first exposure time of a sum of the lateral buffet metrics 985 and the vertical buffet metrics 987. For example, the buffet time exposure analyzer 962 determines combined buffet metrics based on a sum of the lateral buffet metrics 985 and the vertical buffet metrics 987. To illustrate, the buffet time exposure analyzer 962 determines the combined buffet metrics based on the following Equation:

$$\text{combined buffet metrics} = \text{sqrt}[(awz^*\text{constant})^2 + (awy^*\text{constant})^2] \quad \text{Equation 1}$$

where "awz" corresponds to frequency weighted vertical acceleration (e.g., the vertical buffet metrics 987), "awy" corresponds to frequency weighted lateral acceleration (e.g., the lateral buffet metrics 985), "constant" corresponds to a constant value, and "sqrt" corresponds to a square root operation. The buffet time exposure analyzer 962 determines the buffet time exposure metrics 931 based on the combined buffet metrics. For example, the buffet time exposure analyzer 962 determines the buffet time exposure metrics 931 based on the following Equation:

$$\text{buffet time exposure metric}(i) = \text{buffet time exposure metric}(i-1) + (dt^*\text{combined buffet metrics}(i)^2) \quad \text{Equation 2}$$

where "i" represents index (e.g., a particular exposure time) of the buffet time exposure metrics 931 and "dt" represents delta time.

In a second example, the buffet time exposure analyzer 962 determines buffet time exposure metrics 931B based on lateral buffet metrics 985B and vertical buffet metrics 987B. The examples illustrate different slopes for the buffet time exposure metrics 931. In the first example, the buffet time exposure metrics 931A increase gradually when the vertical buffet metrics 987A and the lateral buffet metrics 985A are fairly constant during the buffet exposure time. The buffet time exposure metrics 931B increase sharply in the second example corresponding to a sharp spike in the vertical buffet metrics 987A and the lateral buffet metrics 985A.

Figure 11:
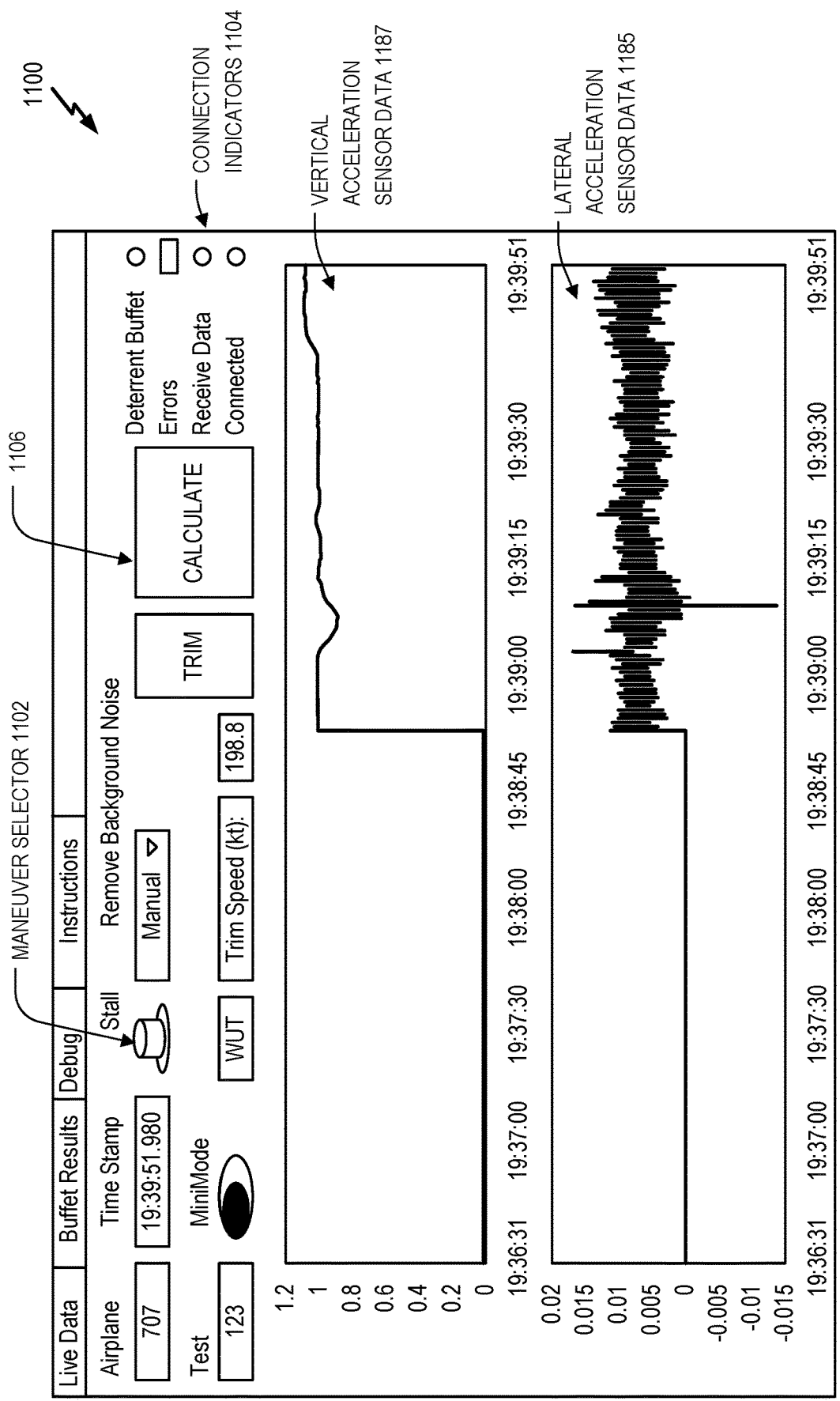
FIG. 11 is a diagram of a user interface (UI) of the systems of FIG. 1 or 10.

Referring to FIG. 11, an example of a user interface (UI) 1100 is shown. In a particular aspect, at least a portion of the UI 1100 is generated by the GUI generator 176 of FIG. 1. For example, at least a portion of the UI 1100 includes the GUI 163.

In a particular aspect, the UI 1100 includes a maneuver selector 1102 that is selectable by a user (e.g., a pilot or a flight test engineer) to select a flight maneuver (e.g., stall) for which data is to be collected. For example, the flight maneuver could be initiated prior to or during a buffet detection period. In a particular aspect, the UI 1100 includes one or more connection indicators 1104 that indicate whether sensor data 105 is being received from the sensor 142 of FIG. 1.

The UI 1100 indicates vertical acceleration sensor data 1187 and lateral acceleration sensor data 1185. In a particular aspect, the buffet analyzer 174 of FIG. 1 extracts the vertical acceleration sensor data 1187 and the lateral acceleration sensor data 1185 from the sensor data 105. In a particular aspect, the vertical acceleration sensor data 1187 or the lateral acceleration sensor data 1185 correspond to the time-domain acceleration sensor data 250 of FIG. 2, the acceleration sensor data 402 of FIG. 4, or a combination thereof. The UI 1100 includes a selectable calculate input 1106 (e.g., a button) that is selectable by the user (e.g., the pilot) to determine the buffet metrics 702 based on the lateral acceleration sensor data 1185 and the vertical acceleration sensor data 1187. For example, the buffet analyzer 174 determines the buffet metrics 702 in response to receiving a selection of the calculate input 1106. In an alternative implementation, the buffet analyzer 174 determines the buffet metrics 702 in real-time as the sensor data 105 is received from the sensor 142. The GUI generator 176 of FIG. 1 generates the GUI 163 indicating the buffet metrics 702 and provides the GUI 163 to the display device 144, as further described with reference to FIG. 12.

Figure 12:
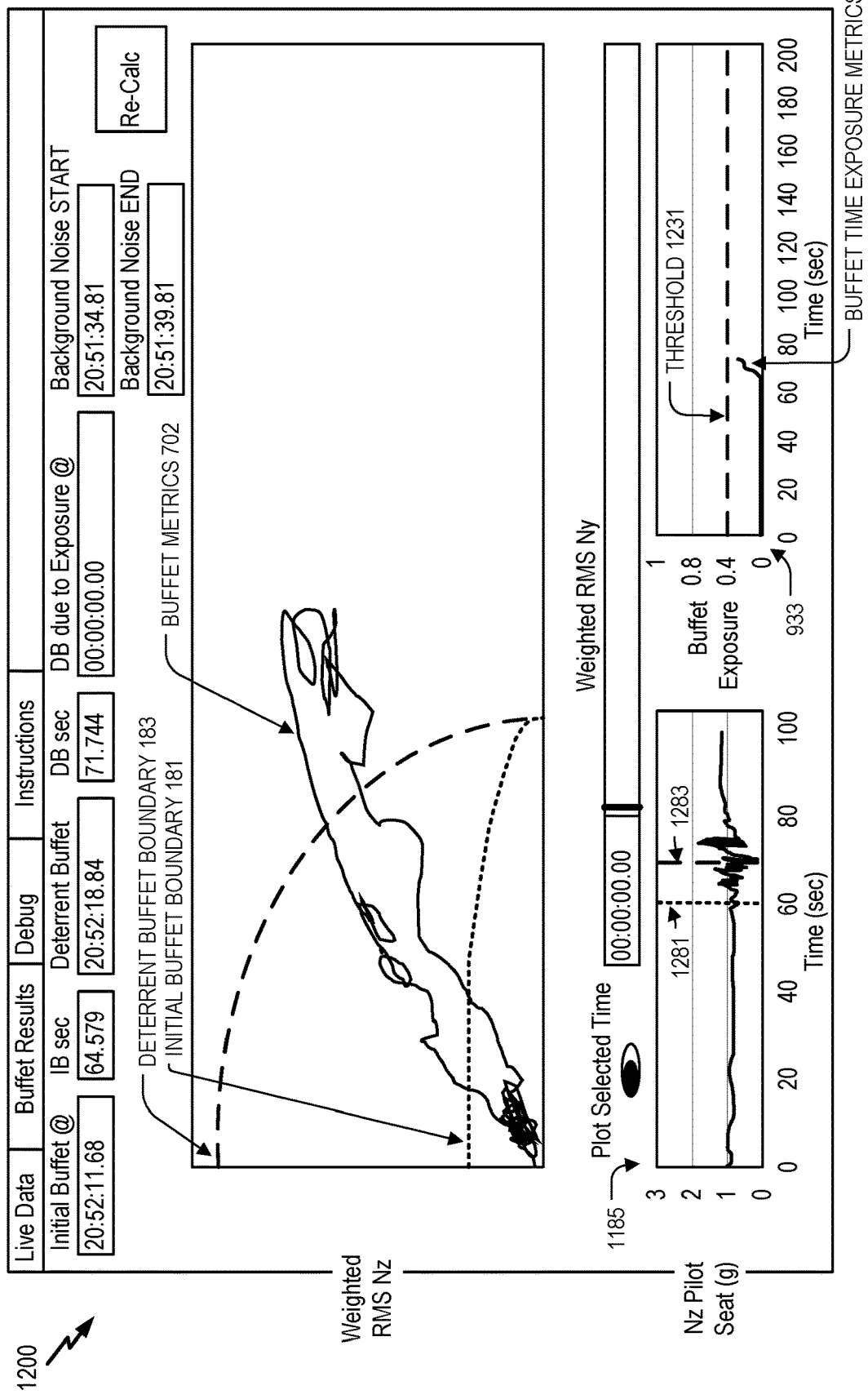
FIG. 12 is a diagram of a UI of the systems of FIG. 1 or 10.

Referring to FIG. 12, an example of a UI 1200 is shown. In a particular aspect, at least a portion of the UI 1200 is generated by the GUI generator 176 of FIG. 1. For example, at least a portion of the UI 1200 includes the GUI 163.

The UI 1200 indicates the initial buffet boundary 181, the deterrent buffet boundary 183, the buffet metrics 702, or a combination thereof. The UI 1200 indicates the lateral acceleration sensor data 1185. In a particular aspect, the UI 1200 indicates that the initial buffet is detected at a time 1281 (e.g., 20 hours 52 minutes and 11.68 seconds or 64.579 seconds after start of buffet detection period) and that deterrent buffet is detected at a time 1283 (e.g., 20 hours 52 minutes and 18.84 seconds or 71.744 seconds after start of buffet detection period). For example, a first buffet metric of the buffet metrics 702 corresponding to the time 1281 (e.g., 64.579 seconds after buffet detection start) exceeds (e.g., is greater than or equal to) the initial buffet boundary 181. A second buffet metric of the buffet metrics 702 corresponding to the time 1283 (e.g., 71.744 seconds after buffet detection start) exceeds (e.g., is greater than or equal to) the deterrent buffet boundary 183.

In a particular aspect, the UI 1200 includes the buffet time exposure indicator 933 that indicates the buffet time exposure metrics 931. A first buffet time exposure metric of the buffet time exposure metrics 931 corresponds to the time 1283 (e.g., 71.744 seconds after buffet detection start). In a particular aspect, the UI 1200 indicates that the first buffet time exposure metric is within a threshold 1231 at the time 1283. The UI 1200 indicates that deterrent buffet due to exposure is not detected.

The buffet analyzer 174 indicates that deterrent buffet is detected at the time 1283 in response to determining that the buffet metrics 702 exceed the deterrent buffet boundary 183 independently of whether the buffet time exposure metrics 931 exceed the threshold 1231. The UI 1200 thus enables detection of deterrent buffet based on the buffet metrics 702 indicating the buffet detected at the aircraft 108.

Figure 13:
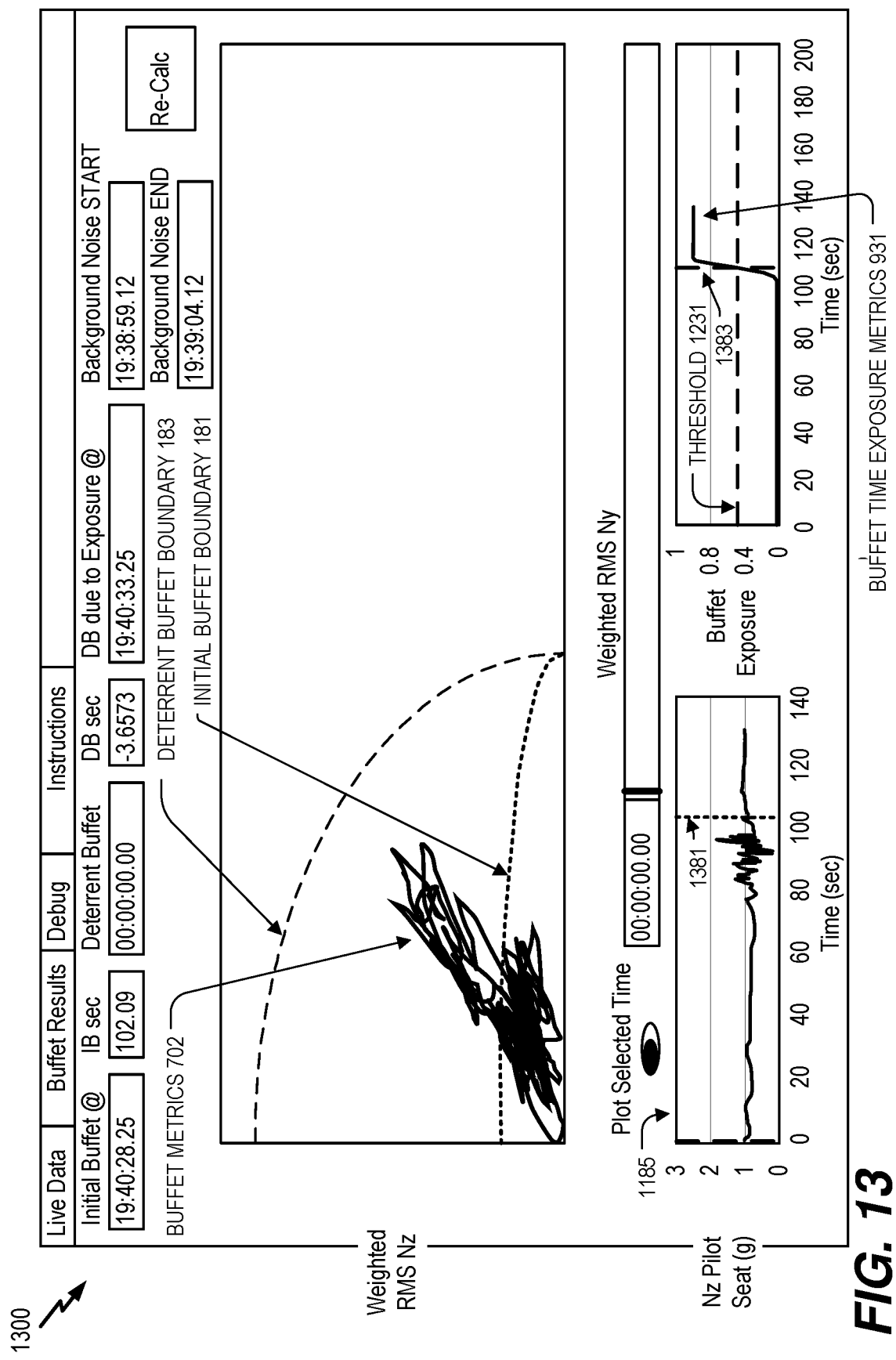
FIG. 13 is a diagram of a UI of the systems of FIG. 1 or 10.

Referring to FIG. 13, an example of a UI 1300 is shown. In a particular aspect, at least a portion of the UI 1300 is generated by the GUI generator 176 of FIG. 1. For example, at least a portion of the UI 1300 includes the GUI 163.

In a particular aspect, the UI 1300 indicates that the initial buffet is detected at a time 1381 (e.g., 19 hours 40 minutes and 28.25 seconds or 102.09 seconds after start of buffet detection period). For example, a first buffet metric of the buffet metrics 702 corresponding to the time 1381 (e.g., 102.09 seconds) exceeds (e.g., is greater than or equal to) the initial buffet boundary 181. The UI 1300 indicates that the buffet metrics 702 have not exceeded the deterrent buffet boundary 183.

In a particular aspect, a first buffet time exposure metric of the buffet time exposure metrics 931 corresponds to a time 1383 (e.g., 19 hours 40 minutes and 33.25 seconds). In a particular aspect, the UI 1300 indicates that the first buffet time exposure metric exceeds (e.g., is greater than or equal to) the threshold 1231 at the time 1383 (e.g., 19 hours 40 minutes and 33.25 seconds). The UI 1300 indicates that deterrent buffet due to exposure is detected at the time 1383 (e.g., 19 hours 40 minutes and 33.25 seconds).

The buffet analyzer 174 indicates that deterrent buffet is detected due to exposure at the time 1383 in response to determining that the first buffet time exposure metric exceeds the threshold 1231 independently of whether the buffet metrics 702 exceed the deterrent buffet boundary 183. The UI 1300 thus enables detection of deterrent buffet based on the buffet metrics 702 indicating the buffet exposure detected at the aircraft 108.

Figure 14:
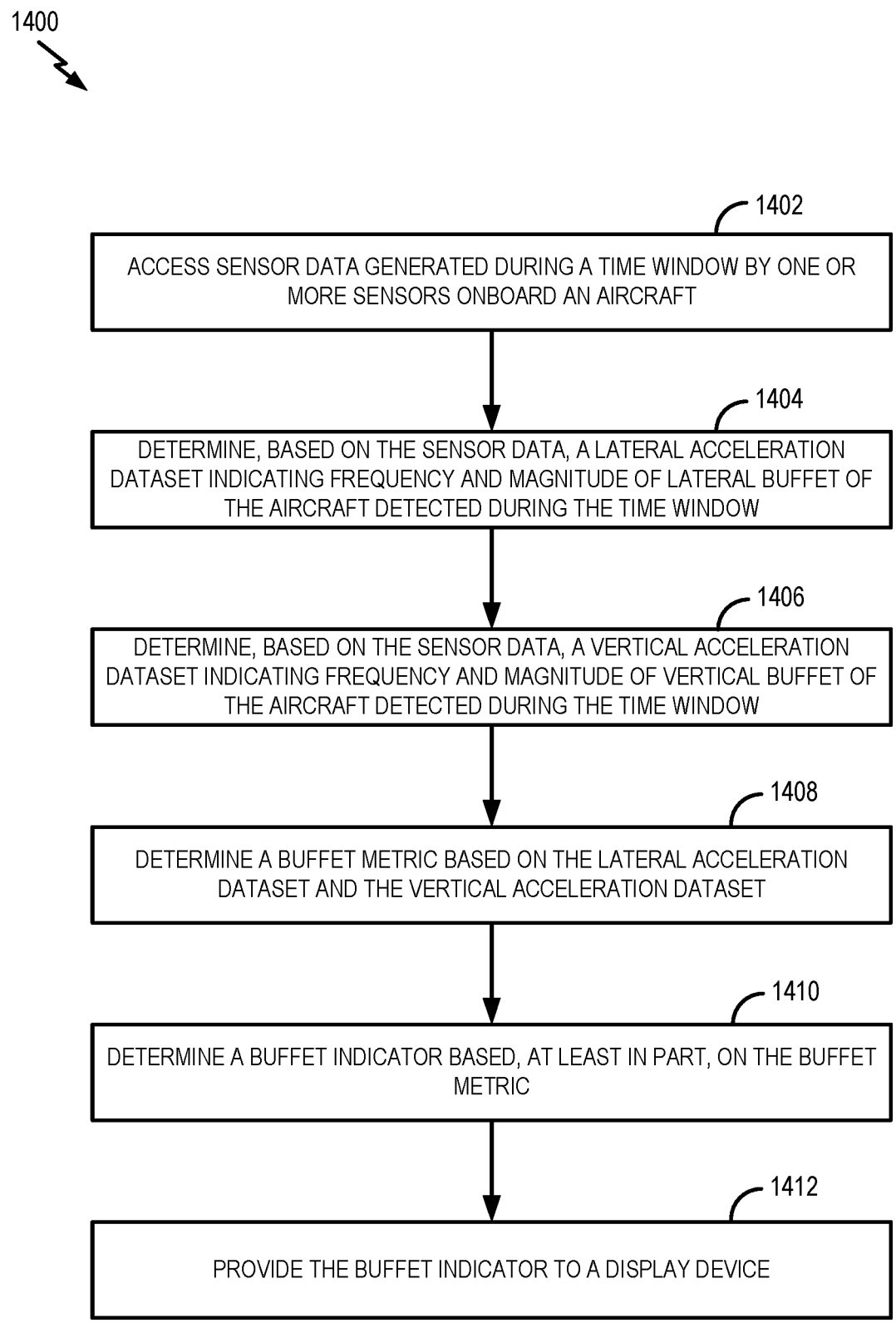
FIG. 14 is a diagram that illustrates a flowchart of an example of a method of detecting aircraft buffet.

Referring to FIG. 14, a method of detecting aircraft buffet is shown and generally designated method 1400. In a particular aspect, one or more operations of the method 1400 are performed by the lateral buffet metric generator 162, the vertical buffet metric generator 164, the buffet analyzer 174, the GUI generator 176, the processor 170, the device 102, the aircraft 108 of FIG. 1, the buffet metric generator 200, the transformer 220, the filter 222, the weighted data generator 224, the reverse transformer 226, the acceleration data analyzer 228 of FIG. 2, the buffet time exposure analyzer 962 of FIG. 9, or a combination thereof.

The method 1400 includes accessing sensor data generated during a time window by one or more sensors onboard an aircraft, at block 1402. For example, the buffet analyzer 174 of FIG. 1 accesses the sensor data 105 generated during the time window 149 by the sensor 142 onboard the aircraft 108, as described with reference to FIG. 1.

The method 1400 also includes determining, based on the sensor data, a lateral acceleration dataset indicating frequency and magnitude of lateral buffet of the aircraft detected during the time window, at block 1404. For example, the buffet analyzer 174 of FIG. 1 determines, based on the sensor data 105, the lateral acceleration dataset 141 indicating frequency and magnitude of lateral buffet of the aircraft 108 detected during the time window 149, as described with reference to FIG. 1.

The method 1400 further includes determining, based on the sensor data, a vertical acceleration dataset indicating frequency and magnitude of vertical buffet of the aircraft detected during the time window, at block 1406. For example, the buffet analyzer 174 of FIG. 1 determines the vertical acceleration dataset 143 indicating frequency and magnitude of vertical buffet of the aircraft 108 detected during the time window 149, as described with reference to FIG. 1.

The method 1400 also includes determining a buffet metric based on the lateral acceleration dataset and the vertical acceleration dataset, at block 1408. For example, the buffet analyzer 174 of FIG. 1 determines the buffet metric 145 based on the lateral acceleration dataset 141 and the vertical acceleration dataset 143, as described with reference to FIG. 1.

The method 1400 further includes determining a buffet indicator based, at least in part, on the buffet metric, at block 1410. For example, the GUI generator 176 of FIG. 1 determines the buffet indicator 147 based, at least in part, on the buffet metric 145, as described with reference to FIG. 1.

The method 1400 also includes providing the buffet indicator to a display device, at block 1412. For example, the GUI generator 176 of FIG. 1 provides the buffet indicator 147 to the display device 144, as described with reference to FIG. 1.

The method 1400 enables automatic detection of initial buffet and deterrent buffet that is more reliable and more repeatable than detection by a pilot. For example, different pilots can have different sensitivity to buffet at various times and may perceive initial buffet or deterrent buffet differently. The buffet analyzer 174 automatically detects no buffet, initial buffet, or the deterrent buffet based on a comparison of the buffet metric 145 to the initial buffet boundary 181, the deterrent buffet boundary 183, or both.

Figure 15:
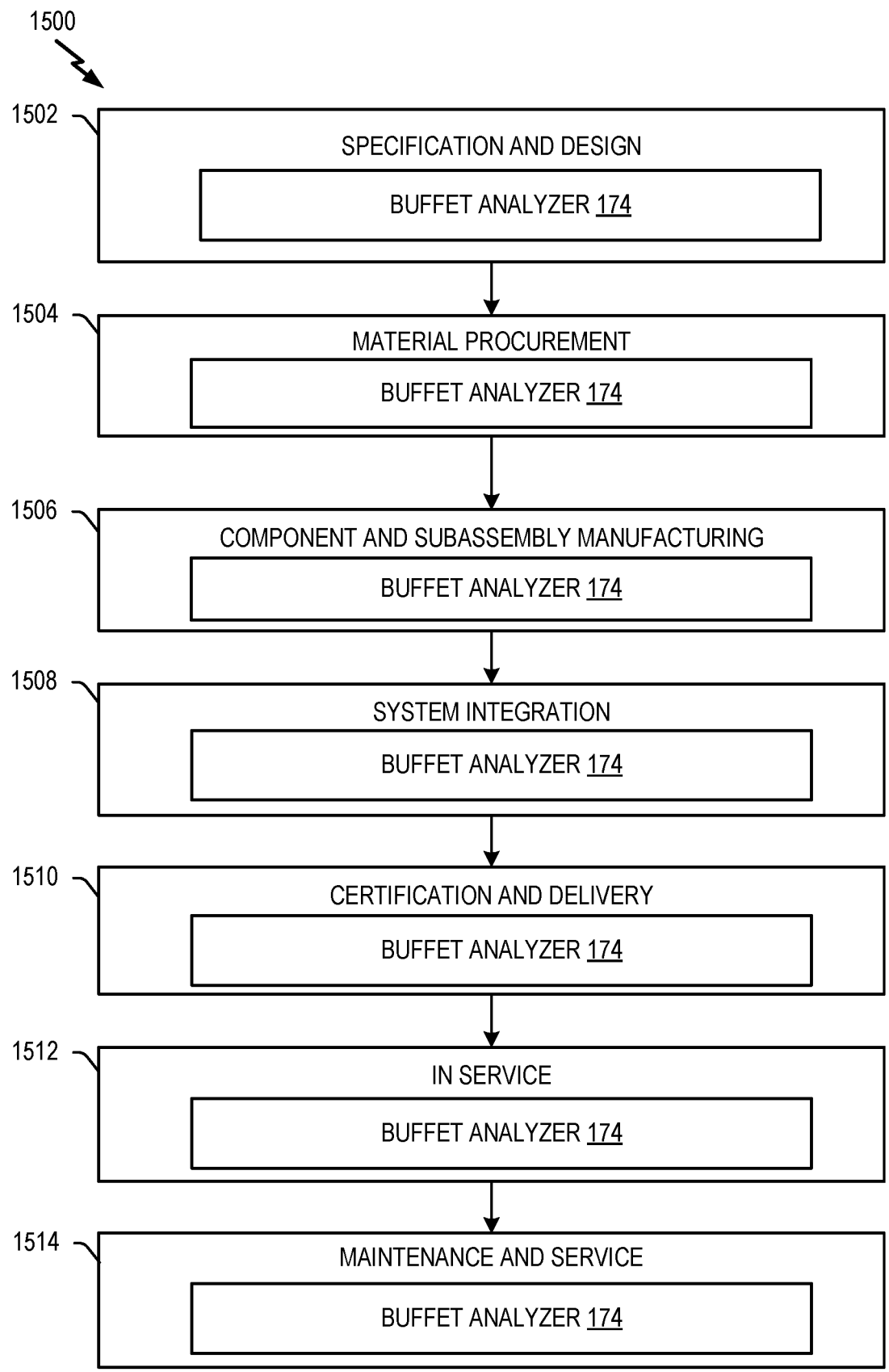
FIG. 15 is a flowchart illustrating a life cycle of an aircraft that includes the buffet analyzer of FIG. 1.

Referring to FIG. 15, a flowchart illustrative of a life cycle of the aircraft 108 is shown and designated method 1500. During pre-production, the method 1500 includes, at block 1502, specification and design of an aircraft, such as the aircraft 108 of FIG. 1. During specification and design of the aircraft 108, the method 1500 may include specification and design of the buffet analyzer 174. At block 1504, the method 1500 includes material procurement, which may include procuring materials for the buffet analyzer 174.

During production, the method 1500 includes, at block 1506, component and subassembly manufacturing and, at block 1508, system integration of the aircraft 108. For example, the method 1500 may include component and subassembly manufacturing of the buffet analyzer 174 and system integration of the buffet analyzer 174. At block 1510, the method 1500 includes certification and delivery of the aircraft 108 and, at block 1512, placing the aircraft 108 in service. Certification and delivery may include certification of the buffet analyzer 174 to place the buffet analyzer 174 in service. In some implementations, the buffet analyzer 174 is used to test the aircraft 108 during the certification process and subsequently removed, e.g., prior to placing the aircraft 108 in service. While in service by a customer, the aircraft 108 may be scheduled for routine maintenance and service (which may also include modification, reconfiguration, refurbishment, and so on). At block 1514, the method 1500 includes performing maintenance and service on the aircraft 108, which may include performing maintenance and service on the buffet analyzer 174. In a particular aspect, maintenance and service requirements could be determined based on the number of reports of initial and/or deterrent buffet, and the total amount of time recorded in either of the buffet states.

Each of the processes of the method 1500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is the aircraft 108 as shown in FIG. 16.

Figure 16:
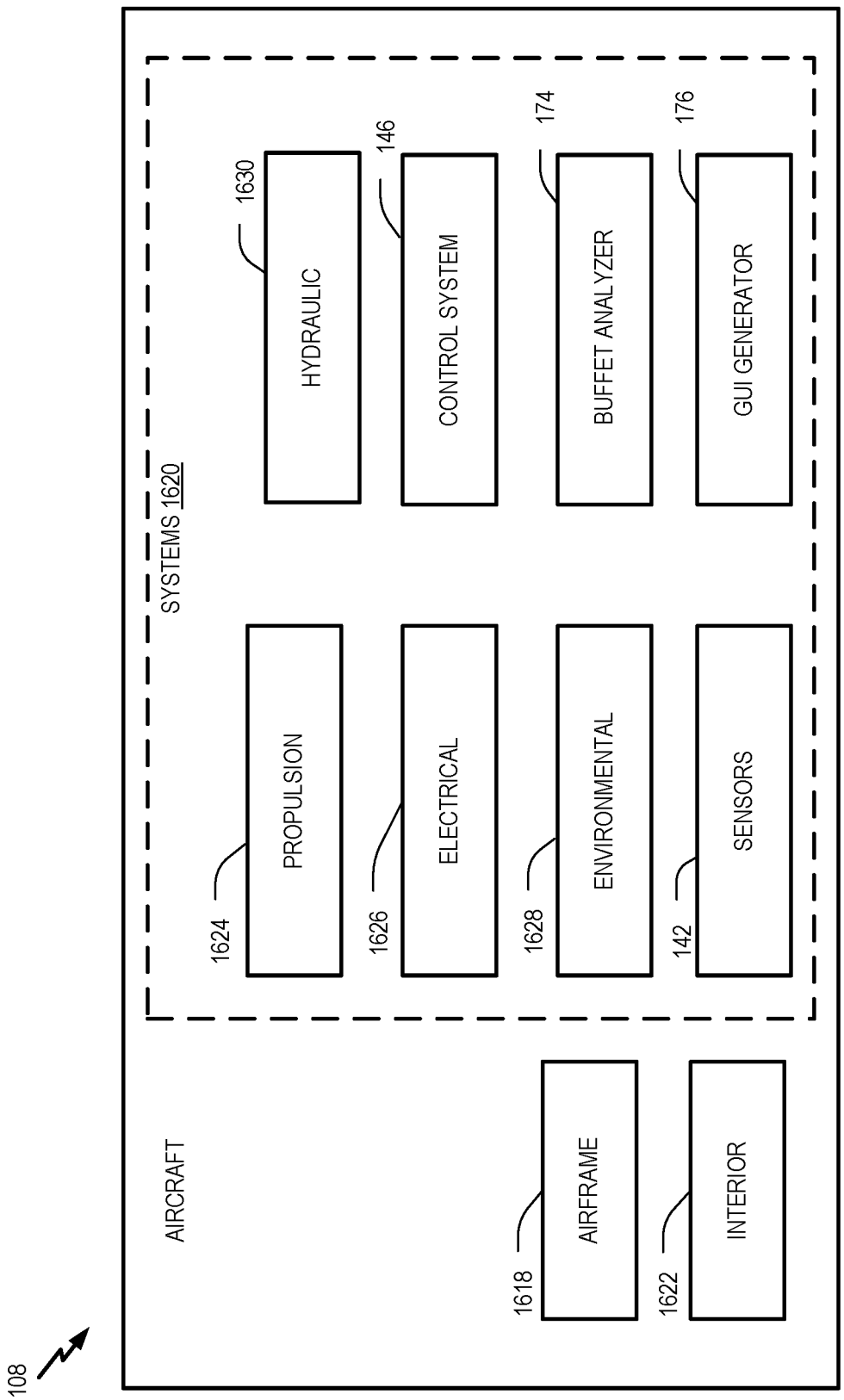
FIG. 16 is a block diagram of an aircraft that is configured to perform buffet detection.

In the example of FIG. 16, the aircraft 108 includes an airframe 1618 with a plurality of systems 1620 and an interior 1622. Examples of the plurality of systems 1620 include one or more of a propulsion system 1624, an electrical system 1626, an environmental system 1628, and a hydraulic system 1630. Any number of other systems may be included. For example, the systems 1620 can include the sensor 142, the control system 146, the buffet analyzer 174, the GUI generator 176, or a combination thereof.

Figure 17:
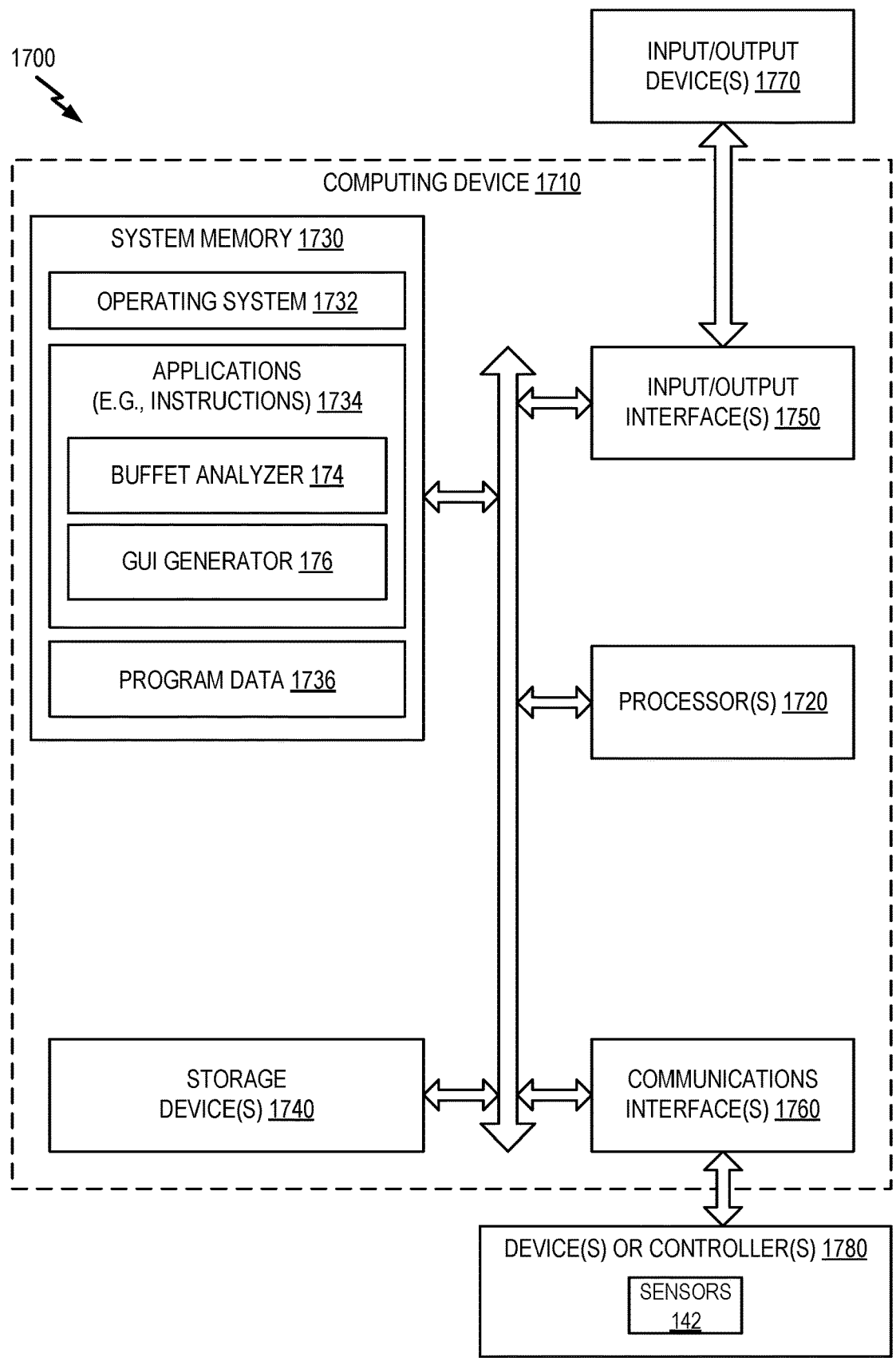
FIG. 17 is a block diagram of a computing environment including a computing device configured to support aspects of computer-implemented methods and computer-executable program instructions (or code) according to the present disclosure.

FIG. 17 is a block diagram of a computing environment 1700 including a computing device 1710 configured to support aspects of computer-implemented methods and computer-executable program instructions (or code) according to the present disclosure. For example, the computing device 1710, or portions thereof, is configured to execute instructions to initiate, perform, or control one or more operations described with reference to FIGS. 1-16.

The computing device 1710 includes one or more processors 1720. The processor(s) 1720 are configured to communicate with system memory 1730, one or more storage devices 1740, one or more input/output interfaces 1750, one or more communications interfaces 1760, or any combination thereof. The system memory 1730 includes volatile memory devices (e.g., random access memory (RAM) devices), nonvolatile memory devices (e.g., read-only memory (ROM) devices, programmable read-only memory, and flash memory), or both. The system memory 1730 stores an operating system 1732, which may include a basic input/output system for booting the computing device 1710 as well as a full operating system to enable the computing device 1710 to interact with users, other programs, and other devices. The system memory 1730 stores system (program) data 1736, such as the lateral acceleration dataset 141, the vertical acceleration dataset 143, data indicating the initial buffet boundary 181, data indicating the deterrent buffet boundary 183, the lateral buffet metric 185, the vertical buffet metric 187, data indicating the time window 149, the buffet metric 145, the buffet indicator 147, the lateral weights 151, the vertical weights 153, the GUI 163 of FIG. 1, the time-domain acceleration sensor data 250, the frequency-domain acceleration sensor data 252, the filtered frequency-domain acceleration sensor data 254, the weighted frequency-domain acceleration sensor data 256, the weighted time-domain acceleration sensor data 258, the buffet metric 260 of FIG. 2, the acceleration sensor data 402 of FIG. 4, the buffet metrics 602 of FIG. 6, the buffet metrics 702 of FIG. 7, the buffet exposure start time 921, the buffet exposure end time 923, the lateral buffet metrics 985, the vertical buffet metrics 987, data indicating the time windows 949, the buffet time exposure metrics 931, the buffet time exposure indicator 933 of FIG. 9, the vertical acceleration sensor data 1187, the lateral acceleration sensor data 1185 of FIG. 11, the threshold 1231, the time 1281, the time 1283 of FIG. 12, the time 1381 of FIG. 13, or a combination thereof.

The system memory 1730 includes one or more applications 1734 (e.g., sets of instructions) executable by the processor(s) 1720. As an example, the one or more applications 1734 include instructions executable by the processor(s) 1720 to initiate, control, or perform one or more operations described with reference to FIGS. 1-16. To illustrate, the one or more applications 1734 include instructions executable by the processor(s) 1720 to initiate, control, or perform one or more operations described with reference to the buffet analyzer 174, the GUI generator 176, or a combination thereof.

In a particular implementation, the system memory 1730 includes a non-transitory, computer readable medium (e.g., a computer-readable storage device) storing the instructions that, when executed by the processor(s) 1720, cause the processor(s) 1720 to initiate, perform, or control operations to perform buffet detection. The operations include accessing sensor data generated during a time window by one or more sensors onboard an aircraft. The operations also include determining, based on the sensor data, a lateral acceleration dataset indicating frequency and magnitude of lateral buffet of the aircraft detected during the time window. The operations further include determining, based on the sensor data, a vertical acceleration dataset indicating frequency and magnitude of vertical buffet of the aircraft detected during the time window. The operations also include determining a buffet metric based on the lateral acceleration dataset and the vertical acceleration dataset. The operations further include determining a buffet indicator based, at least in part, on the buffet metric. The operations also include providing the buffet indicator to a display device.

The one or more storage devices 1740 include nonvolatile storage devices, such as magnetic disks, optical disks, or flash memory devices. In a particular example, the storage devices 1740 include both removable and non-removable memory devices. The storage devices 1740 are configured to store an operating system, images of operating systems, applications (e.g., one or more of the applications 1734), and program data (e.g., the program data 1736). In a particular aspect, the system memory 1730, the storage devices 1740, or both, include tangible computer-readable media. In a particular aspect, one or more of the storage devices 1740 are external to the computing device 1710.

The one or more input/output interfaces 1750 enable the computing device 1710 to communicate with one or more input/output devices 1770 to facilitate user interaction. For example, the one or more input/output interfaces 1750 can include a display interface, an input interface, or both. For example, the input/output interface 1750 is adapted to receive input from a user, to receive input from another computing device, or a combination thereof. In some implementations, the input/output interface 1750 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1770 includes one or more user interface devices and displays, including some combination of the sensor 142, the display device 144, buttons, keyboards, pointing devices, displays, speakers, microphones, touch screens, and other devices.

The processor(s) 1720 are configured to communicate with devices or controllers 1780 via the one or more communications interfaces 1760. For example, the one or more communications interfaces 1760 can include a network interface. The devices or controllers 1780 can include, for example, the sensor 142, the control system 146, the network interface 130, one or more other devices, or any combination thereof.

In some implementations, a non-transitory, computer readable medium stores instructions that, when executed by one or more processors 1720, cause the one or more processors 1720 to initiate, perform, or control operations to perform part or all of the functionality described above. For example, the instructions may be executable to implement one or more of the operations or methods of FIGS. 1-17. In some implementations, part or all of one or more of the operations or methods of FIGS. 1-17 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device for detecting aircraft buffet, the device comprising:
   one or more processors configured to:
   access sensor data generated during a time window by one or more sensors onboard an aircraft;
   determine, based on the sensor data, a lateral acceleration dataset indicating frequency and magnitude of lateral buffet of the aircraft detected during the time window;
   determine, based on the sensor data, a vertical acceleration dataset indicating frequency and magnitude of vertical buffet of the aircraft detected during the time window;
   determine a buffet metric based on the lateral acceleration dataset and the vertical acceleration dataset;
   determine a buffet indicator based, at least in part, on the buffet metric;
   determine a buffet time exposure metric based, at least in part, on the buffet metric;
   provide an indication of the buffet time exposure metric and the buffet indicator to a display device;
   subsequent to providing the indication to the display device, provide a first signal to a control system of the aircraft to modify or end a flight maneuver of the aircraft; and
   receive a second signal from the control system that the first signal was executed.

2. The device of claim 1, wherein the one or more processors are configured to determine the buffet indicator based on a comparison of the buffet metric to a predetermined initial buffet boundary, a predetermined deterrent buffet boundary, or both.

3. The device of claim 1, wherein the one or more processors are configured to store the buffet indicator in a memory.

4. The device of claim 1, wherein the one or more processors are configured to, in response to determining that the buffet metric is within an initial buffet boundary, generate the buffet indicator indicating that no buffet is detected during the time window.

5. The device of claim 1, wherein the one or more processors are configured to, in response to determining that the buffet metric exceeds an initial buffet boundary and is within a deterrent buffet boundary, generate the buffet indicator indicating a time at which initial buffet is detected, wherein the time corresponds to the time window.

6. The device of claim 1, wherein the one or more processors are configured to, in response to determining that the buffet metric exceeds a deterrent buffet boundary, generate the buffet indicator indicating a time at which deterrent buffet is detected, wherein the time corresponds to the time window.

7. The device of claim 1, wherein the one or more processors are configured to, in response to determining that the buffet metric exceeds a deterrent buffet boundary, send the first signal to the control system.

8. The device of claim 1, further comprising a memory configured to store a plurality of weights associated with lateral acceleration frequencies, wherein the one or more processors are further configured to:
   convert time-domain lateral acceleration sensor data to frequency-domain lateral acceleration sensor data, wherein the sensor data comprises the time-domain lateral acceleration sensor data;
generate weighted frequency-domain lateral acceleration sensor data by applying the plurality of weights to at least a portion of the frequency-domain lateral acceleration sensor data;
convert the weighted frequency-domain lateral acceleration sensor data to weighted time-domain lateral acceleration sensor data; and
generate a lateral buffet metric based on the weighted time-domain lateral acceleration sensor data;
wherein the buffet metric is based, at least in part, on the lateral buffet metric; and
wherein the lateral acceleration dataset comprises the time-domain lateral acceleration sensor data.

9. The device of claim 8, wherein the one or more processors are further configured to generate filtered frequency-domain lateral acceleration sensor data by filtering, from the frequency-domain lateral acceleration sensor data, acceleration sensor data associated with lower than a first frequency threshold or greater than a second frequency threshold, and wherein the weighted frequency-domain lateral acceleration sensor data is based on applying the plurality of weights to the filtered frequency-domain lateral acceleration sensor data.

10. The device of claim 8, wherein the plurality of weights is based on frequency weights for whole body vibration specified by international organization for standards (ISO) 2631-1.

11. The device of claim 1, further comprising a memory configured to store a plurality of weights associated with vertical acceleration frequencies, wherein the one or more processors are further configured to:
convert time-domain vertical acceleration sensor data to frequency-domain vertical acceleration sensor data, wherein the sensor data comprises the time-domain vertical acceleration sensor data;
generate weighted frequency-domain vertical acceleration sensor data by applying the plurality of weights to at least a portion of the frequency-domain vertical acceleration sensor data;
convert the weighted frequency-domain vertical acceleration sensor data to weighted time-domain vertical acceleration sensor data; and
generate a vertical buffet metric based on the weighted time-domain vertical acceleration sensor data;
wherein the buffet metric is based, at least in part, on the vertical buffet metric; and
wherein the vertical acceleration dataset comprises the time-domain vertical acceleration sensor data.

12. The device of claim 11, wherein the one or more processors are further configured to generate filtered frequency-domain vertical acceleration sensor data by filtering, from the frequency-domain vertical acceleration sensor data, acceleration sensor data associated with lower than a first frequency threshold or greater than a second frequency threshold, and wherein the weighted frequency-domain vertical acceleration sensor data is based on applying the plurality of weights to the filtered frequency-domain vertical acceleration sensor data.

13. The device of claim 11, wherein the one or more processors are configured to use discrete fourier transform (DFT) to convert the time-domain vertical acceleration sensor data to the frequency-domain vertical acceleration sensor data.

14. The device of claim 11, wherein the one or more processors are configured to use an inverse discrete fourier transform (IDFT) to convert the weighted frequency-domain vertical acceleration sensor data to the weighted time-domain vertical acceleration sensor data.

15. The device of claim 1, wherein the one or more processors are further configured to receive a flight decision input responsive to providing the indication to the display device, wherein the first signal is based on the flight decision input.

16. The device of claim 1, wherein the one or more processors are further configured to determine the buffet time exposure metric by performing an integration of a plurality of buffet metrics associated with a plurality of time windows, wherein the plurality of time windows comprises the time window, and wherein the plurality of buffet metrics comprises at least one of a vertical buffet metric, a lateral buffet metric, or the buffet metric.

17. A method of detecting aircraft buffet, the method comprising:
accessing sensor data generated during a time window by one or more sensors onboard an aircraft;
determining, based on the sensor data, a lateral acceleration dataset indicating frequency and magnitude of lateral buffet of the aircraft detected during the time window;
determining, based on the sensor data, a vertical acceleration dataset indicating frequency and magnitude of vertical buffet of the aircraft detected during the time window;
determining a buffet metric based on the lateral acceleration dataset and the vertical acceleration dataset;
determining a buffet indicator based, at least in part, on the buffet metric;
determining a buffet time exposure metric based, at least in part, on the buffet metric;
providing an indication of the buffet time exposure metric and the buffet indicator to a display device;
subsequent to providing the indication to the display device, providing a first signal to a control system of the aircraft to modify or end a flight maneuver of the aircraft; and
receiving a second signal from the control system that the first signal was executed.

18. The method of claim 17, further comprising converting time-domain lateral acceleration sensor data to frequency-domain lateral acceleration sensor data, wherein the sensor data comprises the time-domain lateral acceleration sensor data, and wherein the lateral acceleration dataset comprises the time-domain lateral acceleration sensor data.

19. The method of claim 17, further comprising generating weighted frequency-domain lateral acceleration sensor data by applying a plurality of weights to at least a portion of frequency-domain lateral acceleration sensor data, wherein the lateral acceleration dataset comprises time-domain lateral acceleration sensor data, and wherein the frequency-domain lateral acceleration sensor data is based on the time-domain lateral acceleration sensor data.

20. The method of claim 17, further comprising generating a stall warning alert in response to determining that the buffet metric exceeds a deterrent buffet boundary.

21. A computer-readable storage device storing instructions that, when executed by one or more processors, cause the one or more processors to:
access sensor data generated during a time window by one or more sensors onboard an aircraft;
determine, based on the sensor data, a lateral acceleration dataset indicating frequency and magnitude of lateral buffet of the aircraft detected during the time window;

determine, based on the sensor data, a vertical acceleration dataset indicating frequency and magnitude of vertical buffet of the aircraft detected during the time window;

determine a buffet metric based on the lateral acceleration dataset and the vertical acceleration dataset;

determine a buffet indicator based, at least in part, on the buffet metric;

determine a buffet time exposure metric based, at least in part, on the buffet metric;

provide an indication of the buffet time exposure metric and the buffet indicator to a display device;

subsequent to providing the indication to the display device, provide a first signal to a control system of the aircraft to modify or end a flight maneuver of the aircraft and receive a second signal from the control system that the first signal was executed.

22. The computer-readable storage device of claim 21, wherein the instructions, when executed by the one or more processors, further cause the one or more processors to:

determine a buffet time exposure metric by performing an integration of a plurality of buffet metrics associated with a plurality of time windows, wherein the plurality of time windows comprises the time window, and wherein the plurality of buffet metrics comprises at least one of a vertical buffet metric, a lateral buffet metric, or the buffet metric; and provide an indication of the buffet time exposure metric to the display device.

23. The computer-readable storage device of claim 21, wherein the instructions, when executed by the one or more processors, further cause the one or more processors to generate the buffet indicator based on a comparison of the buffet metric to an initial buffet boundary and a comparison of the buffet metric to a deterrent buffet boundary.

* * * * *